United States Patent
Malhotra et al.

(10) Patent No.: US 10,944,282 B2
(45) Date of Patent: Mar. 9, 2021

(54) TRANSPORTATION APPARATUS WITH NFC CHARGER

(71) Applicant: NIKE, INC., Beaverton, OR (US)

(72) Inventors: Vikram Malhotra, Portland, OR (US);
Holli Pheil, Portland, OR (US);
Summer L. Schneider, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 560 days.

(21) Appl. No.: 15/577,419

(22) PCT Filed: May 24, 2016

(86) PCT No.: PCT/US2016/033922
§ 371 (c)(1),
(2) Date: Nov. 28, 2017

(87) PCT Pub. No.: WO2016/191423
PCT Pub. Date: Dec. 1, 2016

(65) Prior Publication Data
US 2018/0166906 A1    Jun. 14, 2018

Related U.S. Application Data

(60) Provisional application No. 62/167,521, filed on May 28, 2015.

(51) Int. Cl.
*H02J 7/00*     (2006.01)
*H02J 7/02*     (2016.01)
(Continued)

(52) U.S. Cl.
CPC ............. *H02J 7/025* (2013.01); *A45C 15/00* (2013.01); *H02J 50/10* (2016.02); *H02J 50/50* (2016.02);
(Continued)

(58) Field of Classification Search
USPC ........................................................ 320/108
See application file for complete search history.

(56) References Cited

U.S. PATENT DOCUMENTS 7,906,936 B2   3/2011  Azancot et al.
8,058,837 B2  11/2011  Beers et al.
(Continued)

FOREIGN PATENT DOCUMENTS

EP    2512001    10/2012
EP    2922175    9/2015
(Continued)

OTHER PUBLICATIONS

"ChargeBite—A Social Charger", IndieGoGo, [Online]. Retrieved from the Internet: <URL: https://www.indiegogo.com/projects/chargebite-a-social-charger, (Jun. 2013), 24 pgs.

(Continued)

*Primary Examiner* — Samuel Berhanu
(74) *Attorney, Agent, or Firm* — Schwegman Lundberg & Woessner, P.A.

(57) ABSTRACT

A carry case can house multiple removable electronic devices and facilitate wireless power or data communication among the devices. The case can include a primary coil for inductively receiving energy from a source device, and a secondary coil for inductively providing energy to a target device. The case can include a control circuit or a storage circuit coupled with the primary coil or the secondary coil. The control circuit can coordinate an inductive energy transfer among the source device, the target device, and the storage circuit using the primary or secondary coils.

28 Claims, 10 Drawing Sheets

(51) Int. Cl.
  *H04B 5/00* (2006.01)
  *H02J 50/10* (2016.01)
  *H02J 50/50* (2016.01)
  *A45C 15/00* (2006.01)
  *H02J 50/90* (2016.01)
  *H02J 7/34* (2006.01)
  *H02J 50/80* (2016.01)
  *H02J 50/40* (2016.01)

(52) U.S. Cl.
  CPC ............ *H04B 5/00* (2013.01); *H04B 5/0037* (2013.01); *H04B 5/0075* (2013.01); *H02J 7/00045* (2020.01); *H02J 7/342* (2020.01); *H02J 50/40* (2016.02); *H02J 50/80* (2016.02); *H02J 50/90* (2016.02)

(56) References Cited

U.S. PATENT DOCUMENTS

| | | | | |
|---|---|---|---|---|
| 8,629,654 | B2 | 1/2014 | Partovi et al. | |
| 9,287,722 | B2* | 3/2016 | Williams | H04B 1/385 |
| 9,444,283 | B2* | 9/2016 | Son | H02J 7/025 |
| 9,450,429 | B2* | 9/2016 | Yeiser, IV | H02J 7/00 |
| 10,574,071 | B2* | 2/2020 | Zhijian | H02J 7/342 |
| 2010/0201312 | A1* | 8/2010 | Kirby | H02J 50/12 |
| | | | | 320/108 |
| 2010/0257382 | A1 | 10/2010 | Azancot et al. | |
| 2011/0168507 | A1* | 7/2011 | Penley | A45C 5/14 |
| | | | | 190/18 A |
| 2012/0149301 | A1* | 6/2012 | Wiley | H02J 5/005 |
| | | | | 455/41.1 |
| 2012/0280650 | A1* | 11/2012 | Kim | H02J 50/80 |
| | | | | 320/108 |
| 2012/0326658 | A1* | 12/2012 | Kim | H02J 50/90 |
| | | | | 320/108 |
| 2013/0154557 | A1* | 6/2013 | Lee | H02J 50/90 |
| | | | | 320/108 |
| 2013/0207604 | A1* | 8/2013 | Zeine | H02J 7/0029 |
| | | | | 320/108 |
| 2013/0214931 | A1* | 8/2013 | Chia | A45C 13/02 |
| | | | | 340/815.4 |
| 2013/0221915 | A1* | 8/2013 | Son | H02J 1/14 |
| | | | | 320/108 |
| 2013/0307349 | A1 | 11/2013 | Hall | |
| 2014/0057196 | A1 | 2/2014 | Winand et al. | |
| 2014/0300315 | A1* | 10/2014 | Wakabayashi | H02J 7/025 |
| | | | | 320/108 |
| 2014/0327396 | A1* | 11/2014 | Rejman | B25H 3/02 |
| | | | | 320/108 |
| 2015/0236517 | A1* | 8/2015 | Deguchi | H01F 27/23 |
| | | | | 307/104 |
| 2015/0270740 | A1* | 9/2015 | Lee | H02J 50/40 |
| | | | | 320/108 |
| 2016/0142867 | A1* | 5/2016 | Kim | H04M 1/7253 |
| | | | | 455/41.1 |
| 2016/0322851 | A1* | 11/2016 | Yeh | H04B 5/0037 |
| 2017/0373522 | A1* | 12/2017 | Pelosi | H02J 7/0027 |

FOREIGN PATENT DOCUMENTS

| | | |
|---|---|---|
| EP | 3304760 B1 | 3/2020 |
| WO | WO-2007000055 A1 | 1/2007 |
| WO | WO-2008137996 A1 | 11/2008 |
| WO | WO-2013095065 A1 | 6/2013 |
| WO | 2014076801 | 5/2014 |
| WO | 2015025438 | 2/2015 |

OTHER PUBLICATIONS

"ENERGI+ Power Backpack with Built-in Battery—User Guide", [Online]. Retrieved from the Internet: <URL: http://www.tylt.com/pdfs/ENERGI-PLUS-PwrBkpk-UserGuide-GLOBAL.pdf, (2013), 25 pgs.

"How to Make an Inductive Charging Bag", Make: Projects, [Online]. Retrieved from the Internet: <URL: http://makezine.com/projects/make-41-tinkering-toys/inductive-charging-bag/, (2015), 52 pgs.

"Joey Charger Specs", Urban Junket, [Online]. Retrieved from the Internet: <URL: http://www.urbanjunket.com/pages/joey-charger-specs, (2015), 2 pgs.

"Making Charging Effortless", Patriot Memory LLC, [Online]. Retrieved from the Internet: <URL: http://www.patriotmemory.com/fuelion/, (2014), 9 pgs.

"micoach smart ball", [Online]. Retrieved from the Internet: <URL: http://www.adidas.com/us/micoach-smart-ball/G83963.html, (2015), 10 pgs.

"micoach smart ball", [Online]. Retrieved from the Internet: <URL: http://www.adidas.com/us/micoach-smart-ball/G83963.html, (2015), 4 pgs.

"Proxi-3D In-Device Charging System", [Online]. Retrieved from the Internet: <URL: http://powerbyproxi.com/consumer-electronics/proxi-3d-in-device-charging-system/, (2015), 12 pgs.

"The Purse That Charges Your Phone", [Online]. Retrieved from the Internet: <URL: https://everpurse.com/, (2013), 5 pgs.

Jin, Rui, "Circuits and Systems for Efficient Portable-to-Portable Wireless Charging", MIT Masters Thesis, [Online]. Retrieved from the Internet: <URL: http://dspace.mit.edu/bitstream/handle/1721.1/91694/894232191.pdf?sequence=1, (Jun. 2014), 125 pgs.

"European Application Serial No. 16800637.7, Response filed Jul. 24, 2019 to Extended European Search Report dated Jan. 11, 2019", 20 pgs.

"European Application Serial No. 16800637.7, Extended European Search Report dated Jan. 11, 2019", 8 pgs.

"European Application Serial No. 20165339.1, Extended European Search Report dated Jul. 3, 2020", 12 pgs.

* cited by examiner

TRANSPORTATION APPARATUS WITH NFC CHARGER

CLAIM OF PRIORITY

This application is a U.S. National Stage Filing under 35 U.S.C. 371 from International Patent Application Serial No. PCT/US2016/033922, filed May 24, 2016, published on Dec. 1, 2016 as WO2016/191423, which application claims the benefit of priority of Malhotra et al., U.S. Provisional Patent Application Ser. No. 62/167,521, entitled "TRANSPORTATION APPARATUS WITH NFC CHARGER," filed on May 28, 2015, each of which is herein incorporated by reference in its entirety.

BACKGROUND

Electronic devices that are portable or mobile are ubiquitous for personal, commercial, and business applications. Some examples of portable electronic devices include cellular telephones or smart phones, laptop or tablet computers, Bluetooth headsets, hearing aids, music players or radios, gaming devices, cameras, electric shavers, and electric toothbrushes. Such devices generally include a rechargeable internal battery that stores power for use by the device itself, or powers ancillary equipment that is configured for use with the device.

A dedicated power supply is typically provided with each portable electronic device, and the power supply can be used to charge the internal battery or to directly power one or more features of the device. Such a power supply typically plugs in to an AC mains outlet using a standard interface, and then provides a DC voltage to the device by way of a standard or proprietary hardware interface, or wired connector. In addition to different hardware or physical differences among power supplies, in some examples, a power supply is configured to provide a specified voltage, power, or charge algorithm according to charging or operating requirements of a particular electronic device. As a result, consumers routinely need to retain multiple different chargers in order to support their multiple different electronic devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
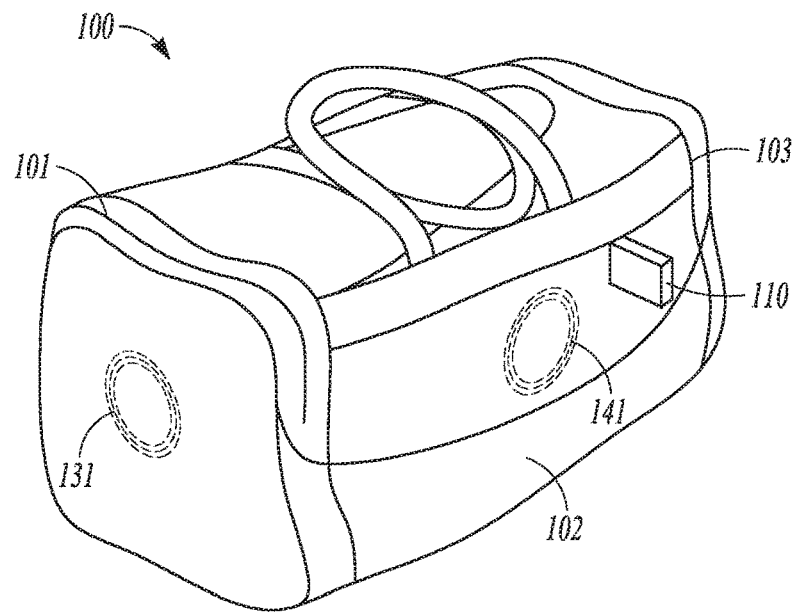
FIG. 1 illustrates generally an example of a carry case that can facilitate inductive communication among multiple devices.

This detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. Further, in this document, the terms "including" and "in which" are used as the plain-English equivalents of the respective terms "comprising" and "wherein."

Portable electronic devices with internal rechargeable batteries are ubiquitous for personal, commercial, and business applications. A battery's useful life can be a function of an energy retention capacity, a device use pattern, heat exposure, a time since last charge, or other factors. As a result, some devices may require charging on a frequent basis, such as daily. In some examples, a cellular phone battery can be depleted after several hours of phone use, and a user may have to charge the cellular phone battery multiple times throughout a day. The user may have multiple chargers, such as at home, work, or in a car, to charge the phone throughout a day. If the user forgets or misplaces a charger, then the user is unable to recharge and use the phone.

To help address the problem of requiring multiple different power supplies to power or charge multiple different electronic devices, so-called universal chargers have been proposed. Such chargers generally include a base unit that receives AC mains or other power, and interchangeable tips that provide a suitable interface between the base unit and multiple different electronic devices. The base unit or the tips can include a variable regulator circuit to adjust voltage, current, or other parameters according to the requirements of a particular device to be charged. While such a charger can reduce a portion of the burden associated with keeping multiple different power supplies, a user still needs to maintain and carry the appropriate tips corresponding to the user's electronic devices.

In addition to exchanging power using a wired or physical connection, some power supply devices and corresponding electronic devices are configured to exchange power inductively or wirelessly. For example, a first winding or coil in a power supply can be connected to an AC mains or other power source, and a first control circuit can drive the first winding or coil at a specified frequency. A second winding or coil in an electronic device can be inductively magnetically coupled with the first winding or coil when the coils are in close proximity. When the first and second coils are sufficiently close together, power can be transferred from the first coil to the second coil. Such an approach is used in, among other devices, electric toothbrushes, such as to avoid providing electrical contacts in a product that is expected to be used in or near a wet environment. Generally, the first and second coils are designed into respective housings with mating or interlocking mechanical features to facilitate alignment of the coils. While such mechanical features can help improve efficiency of charging, they can also inhibit an ability to use the power supply or first coil with other electronic devices without the appropriate mating mechanical feature.

Some wireless power transfer devices are provided as mats or pads substantially without mechanical alignment features. Such mats generally include one or more embedded coils, or spirals, of conductors that are arranged substantially parallel to a surface of the mat and carry electric current to generate a magnetic field. A receiver coil, such as wound around a magnetic core, can be positioned on a surface of the pad to receive an energy or power signal by way of the magnetic field.

The wired and wireless power supplies described above generally require a power source such as AC mains. Some charging devices include or incorporate a power pack, or a relatively large or high capacity battery, to hold energy sufficient to provide multiple charges to one or more other electronic devices. In some examples, such power packs can be intermittently charged, such as weekly, by connecting the pack to AC mains. Some power packs are integrated with bags or carrying cases and are configured with one or more ports for wired connection to portable electronic devices such as a laptop or cell phone.

Configuring an apparatus to use or facilitate use of a wireless energy transfer, such as among multiple portable electronic devices, is not necessarily straight forward. Items may shift in a portable carry case, both with respect to the carry case as well as with respect to one another. Apportioning power from a finite power source to multiple different portable electronic devices, potentially with different power requirements, may likewise raise power management issues owing to limited resources.

In an example, a portable carry case is configured to receive multiple portable electronic devices and to facilitate a power or data transfer among the devices, such as using inductive communication means. The portable carry case can include at least a primary coil for inductively receiving energy from a source coil in a removable wireless source device. The portable carry case can include at least a secondary coil for inductively providing energy to a target coil in a removable wireless target device. The portable carry case can include a data storage circuit such as a memory circuit, or a power storage circuit such as a battery or capacitor. The memory circuit or power storage circuit can be communicatively coupled with at least the primary coil and the secondary coil.

In an example, a portable carry case includes a control circuit configured to coordinate a power or data transfer using one or both of a source device and a target device according to a selected operating mode. The operating mode can optionally be selected automatically or by a user. In a first operating mode, the control circuit can be configured to coordinate an inductive power or data transfer from the removable wireless source device to the power or data storage circuit using the primary coil, such as to charge a battery or power pack that is integrated with the carry case. In a second operating mode, the control circuit can be configured to coordinate an inductive power or data transfer from the removable wireless source device to the removable wireless target device using the primary coil and the secondary coil. That is, the carry case can facilitate a power transfer between the removable wireless source and target devices by way of coils or other circuitry integrated with the carry case itself. In a third operating mode, the control circuit can be configured to coordinate an inductive power or data transfer from the power or data storage circuit to the removable wireless target device using the secondary coil.

In an example, a user interface selectively apportions power or data among multiple different electronic devices that are in power or data communication with the carry case. The user interface can be included in the carry case itself, such as using a touchscreen display that is integrated with the carry case. The user interface can be included in a source device or in a target device. The user interface can be configured to display to a user an available power metric, and can receive information from the user about apportioning or providing the available power to two or more other electronic devices that are in power communication with the carry case. In an example, a power transfer scheme that is selected or updated using the user interface can be implemented by a charge management controller (CMC) that is on-board the carry case.

In an example, the carry case can include one or more compartments that are configured to respectively receive at least one portable electronic device. A first compartment can be configured to receive a power or data source device, and a second compartment can be configured to receive a power or data target device. A compartment can include one or more mechanical features to align the received device with a wired or wireless power or data communication port in the carry case. For example, the first compartment can include a physical alignment feature, such as a magnet or a tapered receiving pouch, and the alignment feature is configured to orient a source device such that a source coil in the source device is physically aligned with a primary coil in the carry case when the source device is placed in the first compartment. In an example, a power and/or data transfer between the source and primary coils can be enabled or disabled according to a detected alignment or transfer efficiency between the coils.

FIG. 1 illustrates generally an example of a transportation apparatus that can receive or house multiple portable electronic devices, among other things, and the electronic devices can be configured to exchange power or data wirelessly. The transportation apparatus is referred to generally herein as a carry case 100, and is illustrated generally as a duffle bag or gym bag in FIG. 1. The transportation apparatus can include, without limitation, a duffle bag, briefcase, backpack, holster, case, pouch, handbag, bag, wallet, a wearable or carry-able article for holding two or more other items, or some other type of case. In an example, the carry case is or includes a pocket or other compartment that is attached to or appurtenant to an article of clothing, or to a transportation vehicle such as a bicycle, car, boat, or airplane. In other examples, a stationary apparatus can include the same or similar features as described herein for the carry case. For example, the features can be implemented in a locker or in some other fixed storage vessel.

The carry case 100 includes at least one compartment and optionally includes multiple compartments. The multiple compartments can be different designated areas in the same continuous space, or the multiple compartments can be divided by physical partitions, such as using fabric, leather, nylon, or another material integral with the carry case 100. In the example of FIG. 1, the carry case 100 includes a first compartment 101, a second compartment 102, and a third compartment 103. Any one or more of the compartments can include or can be communicatively coupled with at least one induction coil for wireless power or data communication. In an example, any one or more of the compartments receives a portable electronic device, and the portable electronic device can communicate with one or more of the induction coils in the carry case 100.

Wireless power or data communication is referred to generally herein as near field communication, or NFC. A system for wireless power communication is sometimes referred to as an inductively coupled power transfer (ICPT) system. Such a system typically uses respective conductive coils that are disposed in different devices, and the devices are located proximally to each other such that a magnetic field generated or produced by a coil in one device is detected or received by a coil in a second device.

The portable electronic devices referred to herein generally include at least one coil that is configured for NFC, and the devices can typically be used as a source device (e.g., for providing power or data to another circuit) or as a target device (e.g., for receiving power or data from another circuit). A portable electronic device can include, without limitation, any one or more of a mobile phone, Bluetooth headset, camera, laptop, PDA, audio player, game player, or other active device. As used herein, the term "active" refers to a device or component that uses, consumes, or stores power or data.

In an example, a portable electronic device includes an article of active apparel, such as including one or more integrated sensors, or including a power or data storage circuit or a communication circuit. A portable electronic device can include active sporting equipment, such as a baseball bat, ball, helmet, pad, mat, or other equipment that includes an active circuit. In some examples, an active circuit includes one or more passive elements that communicates with or influences another electronic device. In a particular example, a source device includes any one or more of a mobile phone, Bluetooth headset, camera, laptop, PDA, audio player, game player, and a target device includes any one or more of active sporting equipment, such as a baseball bat, ball, helmet, pad, mat, or other equipment that includes an active circuit. While examples of source devices and target devices are specified, it is to be recognized that, in various circumstances and examples, any portable electronic device may function as a source device or a target device as appropriate.

The carry case 100 optionally includes a control circuit 110. The control circuit 110 can be integrated with the carry case 100, such as by being physically coupled to a material comprising the carry case 100. In an example, the control circuit 110 is included as a portion of a portable electronic device that is usable together with or storable in the carry case 100. The control circuit 110, sometimes referred to as a charge management controller or CMC, can coordinate or facilitate one or more power or data communication modes among any two or more of a source device, a target device, and an intermediate circuit included in the carry case 100. The intermediate circuit can include, among other things, a data processor circuit, a power storage circuit such as a battery circuit, or a memory circuit. In an example, the carry case 100 includes charging means to replenish the power storage circuit. For example, the carry case 100 can include an AC mains interface, a solar cell, or means for harvesting kinetic energy (e.g., using a piezo element or MEMS element).

In an example, the carry case 100 includes the control circuit 110, a power storage circuit, an input coil 131 and an output coil 141. In a first mode, the control circuit 110 coordinates a power signal transmission from a source device to the power storage circuit using the input coil. That is, in the first mode, a power signal from the source device is wirelessly received by the input coil 131 and transmitted to the power storage circuit that is included in the carry case 100. The received power signal can be stored for later dispensing to a target device, such as according to instructions from the control circuit 110. The first mode can include wirelessly transmitting multiple power signals from multiple respective source devices to the power storage circuit, such as using multiple respective input coils in the carry case 100.

In a second mode, the control circuit 110 coordinates a wireless inductive power signal transmission from the source device to the target device using the input and output coils 131 and 141 in the carry case 100. In an example, a power signal is wirelessly received from the source device by the input coil, and then the power signal is transmitted using physical electrical conductors to the output coil 141. At the output coil 141, the power signal is wirelessly and inductively transmitted to the target device. In an example, the control circuit 110 is coupled to the physical electrical conductors between the input and output coils 131 and 141, and the control circuit 110 adjusts a power signal transmission characteristic. For example, a power signal received from the input coil 131 at a first power level or frequency can be converted to a second power level or frequency and then provided to the output coil 141 for transmission to the target device.

In a third mode, the control circuit 110 coordinates a power signal transmission from the power storage circuit to the target device using the output coil 141. That is, in the third mode, a power signal provided by the power storage circuit is wirelessly received by the target device. The second and third modes can include apportioning the power signal to multiple different target devices, such as by wirelessly communicating the power signal serially temporally to the different target devices, or by wirelessly communicating the power signal in parallel to the different target devices, such as using multiple different output coils. In an example, the respective power signals provided by the multiple different output coils have different power signal characteristics.

In an example, the control circuit 110 is configured to evaluate a relative efficiency of multiple different available wireless signal transfer configurations. In an example, the input coil 131 and output coil 141 each comprise multiple different coils, such as arranged in respective two-dimensional or three-dimensional arrays, as further described below. The control circuit 110 can be configured to evaluate multiple coils from each array to identify a most efficient power or data communication path, for example, between the source device and the input coil, or between the output coil 141 and the target device. That is, the control circuit 110 can evaluate a power or data transmission characteristic between the source device and multiple other coils that are available at the input side. The power or data transmission characteristic can include, among other things, a percentage of power received versus a total transmitted power. Characteristic information can be shared among any of the source device, the target device, and the control circuit 110, such as using the same wireless communication channel that is used for the power signal transmission, or using another wireless communication channel, such as a WiFi, Bluetooth, or other channel.

The control circuit 110 can evaluate the multiple coils from each array and automatically select for use in power or data transmission a particular one or combination of coils that is determined to provide a best power or data transmission characteristic. In an example, during an ongoing power transfer event, the system can intermittently re-evaluate the same or a different power or data transmission characteristic for the selected coil(s), such as may have been used when the transmission channel was first selected. If the characteristic changes by more than a specified threshold amount, the control circuit 110 can automatically re-evaluate power or data transmission characteristics of other available coils to determine whether the most optimal or most efficient device and coil pair are used. If a more efficient pair is identified, then it can be automatically selected for use and implemented to carry out the remainder of the energy transfer.

Source and target devices can be co-located proximally in the same compartment of the carry case 100, or can be located in adjacent compartments in the carry case 100. The most efficient power or data transmission channel can, in some examples, be a direct path from a source coil in the source device to a target coil in the target device, such as without using any circuits or conductors included in the carry case 100. The control circuit 110 can be configured to include, in its evaluation of the available coils, an evaluation of a direct inductive coupling between the source and target devices.

In an example, the control circuit 110 can be configured to implement a charge apportioning scheme. A charge apportioning scheme can be user-specified or can be determined automatically, such as using the control circuit 110. In an example, a charge apportioning scheme includes a schedule for receiving a power signal from one or more source devices. The schedule can include, among other things, a source device priority list for determining a sequence by which power signals from multiple available source devices are received. In an example, a charge apportioning scheme includes a schedule for providing a power signal to one or more target devices. The schedule can include, among other things, a target device priority list for determining a sequence by which an available power signal is provided or distributed to the one or more target devices. In an example, a charge apportioning scheme is automatically determined by the control circuit 110 based on prior use patterns or characteristics of one or more of the target devices, based on a present charge status of one or more source or target devices, or based on user preference, such as can be specified by a user. An interface can optionally be used to update, adjust, or monitor a charge apportioning scheme. In an example, the interface is provided using the source or target device. In an example, the interface is provided by an ancillary device that is in data communication with the control circuit 110, with the source device, or with the target device.

Figures 2A, 2B:
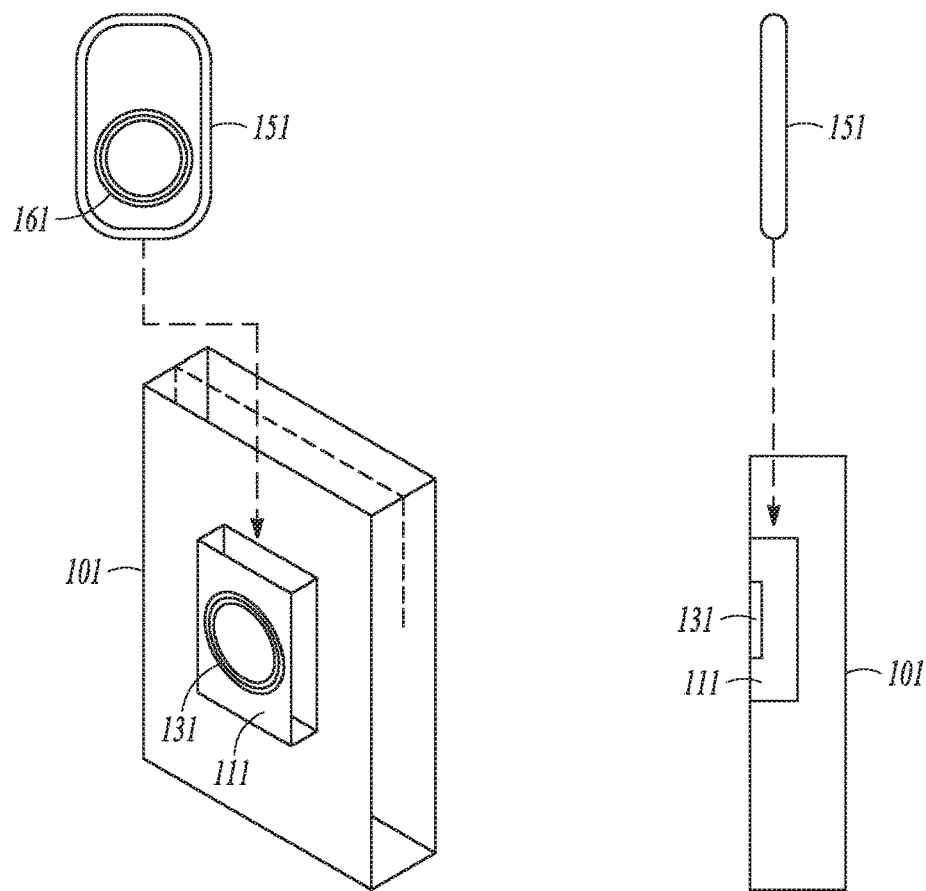
FIGS. 2A and 2B illustrate generally perspective and side views of an example of a compartment of a carry case.

FIGS. 2A and 2B illustrate generally a perspective view and a side view, respectively, of an example of the first compartment 101 of the carry case 100. In the example of FIGS. 2A and 2B, the first compartment 101 is configured to receive at least a first device 151. In this example, the first device 151 includes a cellular telephone or smart phone. Other portable electronic devices can similarly be used as the first device 151. The first device 151 includes a first coil, herein referred to generally as a source coil 161. It is to be appreciated that the first device 151 can be similarly configured to be a target device. The source coil 161 is configured to receive or transmit at least one of a power signal or a data signal. For example, the first device 151 can include an internal battery that is configured to be wirelessly inductively charged by way of a corresponding charging coil, such as provided in a charging mat. The corresponding charging coil provides an inductive power signal to the first device 151 using the source coil 161.

The first compartment 101 includes a holster 111 that is sized to receive the first device 151. The holster 111 can be configured to orient or secure the first device 151 in a particular orientation. In an example, the input coil 131 is arranged at one of the holster 111 walls such that when the first device 151 is properly positioned in the holster 111, the source coil 161 and the input coil 131 are substantially and sufficiently aligned to enable power or data communication between the coils. That is, the coils are aligned such that a magnetic field, generated by an electric current passing through one coil, is received at the other coil and, as a result, an electric current is induced in the receiving coil. The induced electric current can be used by a device coupled to the receiving coil, such as to review charging power or to receive information.

The holster 111 or the first compartment 101 can include one or more features to align the first device 151 in the holster 111. For example, the holster 11 can have a tapered shape such that when a user places the first device 151 at an entry portion or receiving portion of the holster 111, the first device 151 is directed (e.g., under the influence of gravity) into a specified orientation relative to the holster 111 or relative to the first compartment 101. In an example, the holster 111 or the first compartment 101 includes one or more magnetic components, and the first device 151 includes mating magnetic components. When the first device 151 is inserted into the first compartment 101, the first device 151 can be directed by the magnetic forces from the magnets toward a specified orientation.

The input coil 131 is provided at an outer side wall of the first compartment 101 of the carry case 100. The input coil 131 can be located elsewhere in the first compartment 101 as long as its location is suitable for alignment with the source device, or first device 151, and the source coil 161. In an example, the input coil 131 is movable by a user to different locations in the first compartment 101 to accommodate other differently sized or differently shaped source devices.

The first compartment 101 can include an array of input coils. The array of input coils can be provided at or along one or more sidewalls of the first compartment 101. In an example, at least one sidewall of the first compartment 101 is substantially entirely covered by a two-dimensional array of coils positioned adjacent to one another. More than one sidewall can optionally include respective arrays of coils. For example, the first compartment 101 can include a sidewall and a floor, and each of the sidewall and the floor can include its own coil array. A source device, such as the first device 151, can have its source coil 161 arranged substantially parallel to a planar face of the device. In this example, when the first device 151 is placed upright in the first compartment 101, the source coil 161 can interface with a sidewall coil. When the first device 151 is lying down on the floor of the first compartment 101, the source coil 161 can interface with a floor coil.

In an example, each of the input coils in the array can be configured for use with different respective source devices. For example, the different input coils can have different shapes, sizes, power ratings, or operating frequencies, among other different characteristics, such as corresponding to the characteristics of the different source devices configured to communicate with the different input coils. In an example, multiple different input coils having the same or similar characteristics can be provided in a single plane or layer, or multiple layers of input coils can be provided. Any one or more of the planar or layered coils can be selected for use based on an orientation or position relative to a particular source device, or based on a characteristic of a coil itself, such as a power rating, size, or other characteristic.

Figure 3:
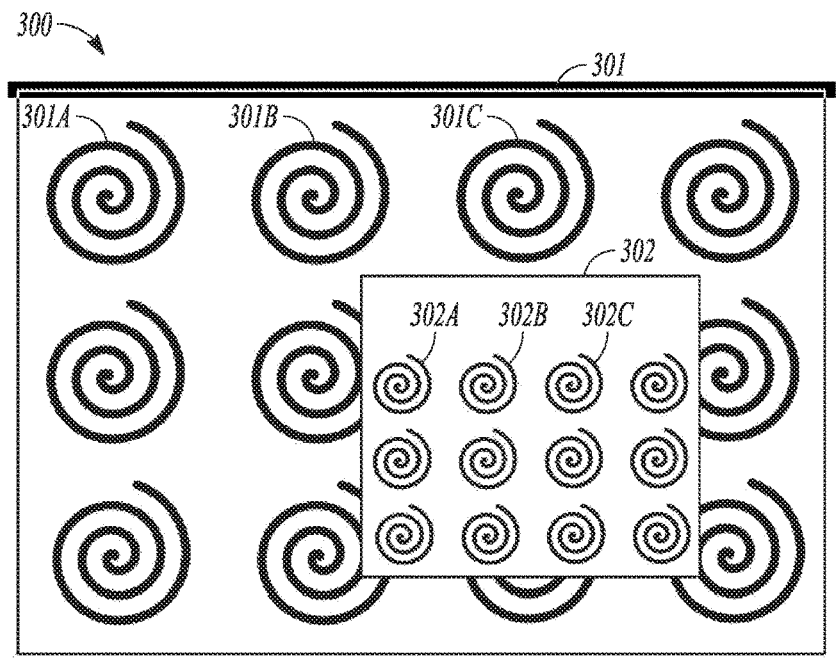
FIG. 3 illustrates generally a schematic view of a first inductive coil assembly.

FIG. 3 illustrates generally a schematic view of a first inductive coil assembly 300. The first inductive coil assembly 300 includes a first coil plane 301 and a substantially parallel, overlapping second coil plane 302. Either of the first and second coil planes 301 and 302 can be used independently. In some applications, coils from the different planes can be used simultaneously or in concert. In the example of FIG. 3, the first coil plane 301 includes a first array of coils 301*a*, 301*b*, 301*c*, etc. The second coil plane 302 includes a second array of coils 302*a*, 302*b*, 302*c*, etc.

In the example of FIG. 3, the individual coils are illustrated generally as spirals. In actual implementations, a coil can include an electrically conductive material arranged according to multiple different shapes including, without limitation, flat or planar hexagonal shapes, substantially concentric circles, helical shapes, or spirals. The conductors themselves can have different cross-sectional shapes or sizes. For example, a conductor can have a round or substantially flat and rectangular profile. Any one or more individual coils can be provided in multiple layers, such as using different overlapping layers of a multi-layer PCB, wherein adjacent coil layers are connected using conductive vias. Coils can have different conductor dimensions, different numbers of revolutions, or can be formed from different conductive materials.

Figure 4:
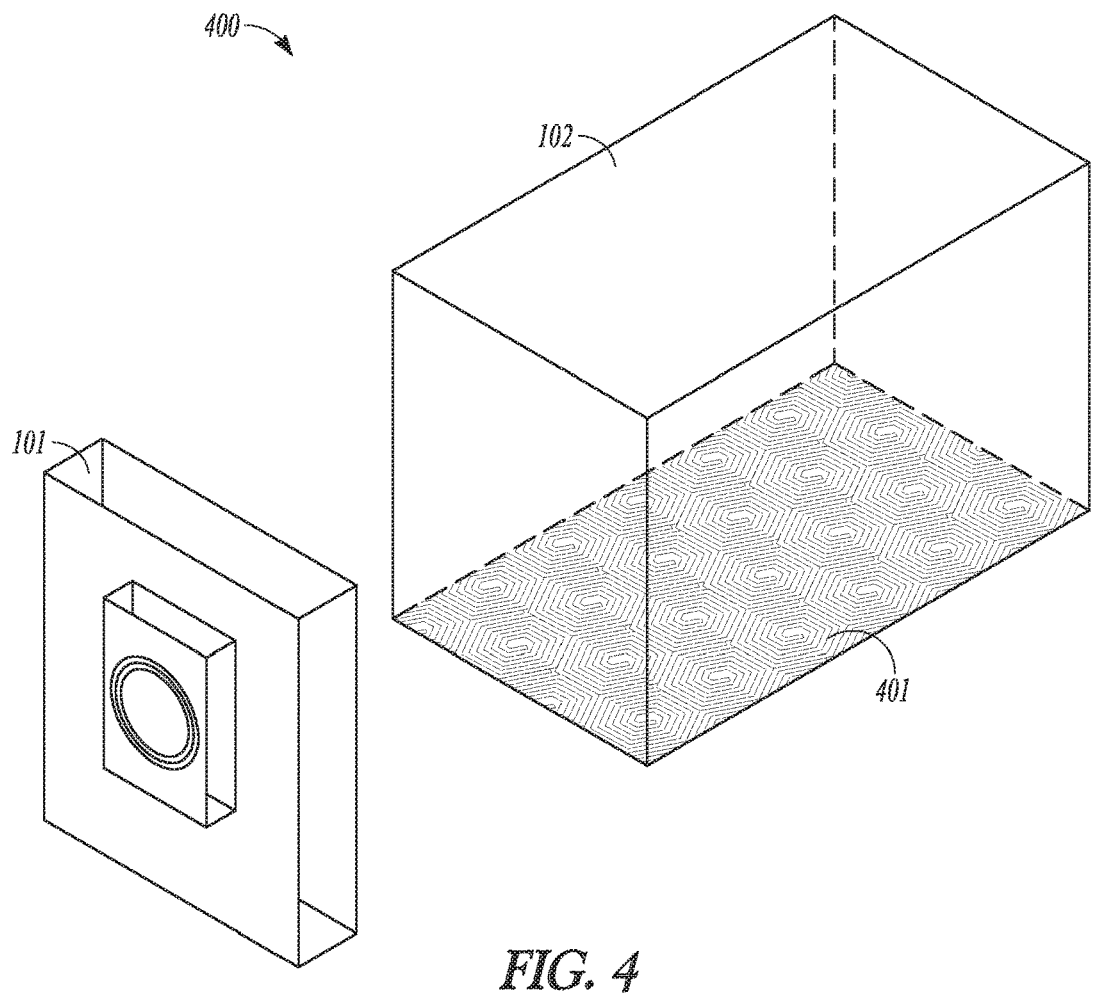
FIG. 4 illustrates generally an exploded perspective view of first and second compartments of a carry case.

FIG. 4 illustrates generally an example 400 that includes an exploded perspective view of the first and second compartments 101 and 102 of the carry case 100. In the example of FIG. 4, the second compartment 102 includes a first panel coil array 401. The first panel coil array 401 is disposed on and covers substantially all of the floor of the second compartment 102. The first panel coil array 401 includes multiple overlapping coil layers to reduce void areas between coils. Areas between adjacent coils in one plane are generally filled by other coils in an adjacent plane. Any one or more of the coils in the first panel coil array 401 can be configured to communicate power or data with a source device or a target device. The control circuit 110 can optionally be coupled with each of the coils in the first panel coil array 401 and can selectively enable or disable power or data communication using any coil in the array, such as according to a measured transmission efficiency characteristic that is a function of a device location relative to particular coils in the array.

For clarity of the illustration, the second compartment 102 is shown in the example of FIG. 4 as having only the first panel coil array 401 disposed on the floor surface. In other examples, a panel coil array can be disposed on any one or more of the other surfaces of the second compartment 102. In an example, the second compartment 102 includes respective panel coil arrays covering substantially all of each of five or six sides of the compartment. By providing more coils, at least around the periphery of the second compartment 102, a device that is randomly placed inside of the second compartment 102 is more likely to be suitably aligned with at least one of the coils for wireless inductive power or data communication.

In an example, items in the second compartment 102 include an active device configured for wireless inductive communication and other contents that may not be configured to wireless inductive communication (e.g., non-active books, clothing, foodstuffs, etc.). The active device can be positioned on top of the other contents and the active device can be inductively communicatively coupled with a coil in an array disposed on the top surface of the second compartment 102. If the contents including the active device shift, such as during transport of the carry case 100, then the control circuit 110 can identify a different coil to use for ongoing power or data communication with the active device, including optionally a coil that is associated with a different panel coil array.

In an example, a portable electronic device for use with the carry case 100 can similarly include multiple different coils. The multiple different coils can be arranged in multiple different axes or planes, such as to facilitate coupling with other coils outside of the device. In an example, all or a portion of the multiple different coils can be used for power or data communication to improve throughput. The size and shape of the coils in the carry case 100 and in active devices used with the carry case 100 need not be the same.

Each coil in the carry case 100 can be switched or driven by a dedicated control circuit, or the coils can be switched or driven by a central circuit such as the control circuit 110. A sensing mechanism, such as a physical sensor or a wireless communication activity sensor, can be coupled to the control circuit 110 and configured to detect a presence of a portable electronic device. In an example, a physical sensor includes a contact sensor that generates a detector signal when a device physically contacts the sensor. A wireless communication activity sensor can detect the presence of a wireless communication signal, such as a WiFi, Bluetooth, or other wireless signal, and the wireless communication activity sensor can optionally be configured to detect or identify a source of the detected wireless signal, for example by identifying a signal strength profile. Other sensor types, including optical, acoustic, pressure, thermal, motion, or infrared, among others, can be used to determine a presence (or a likelihood of a presence) of an electronic device.

Figure 5:
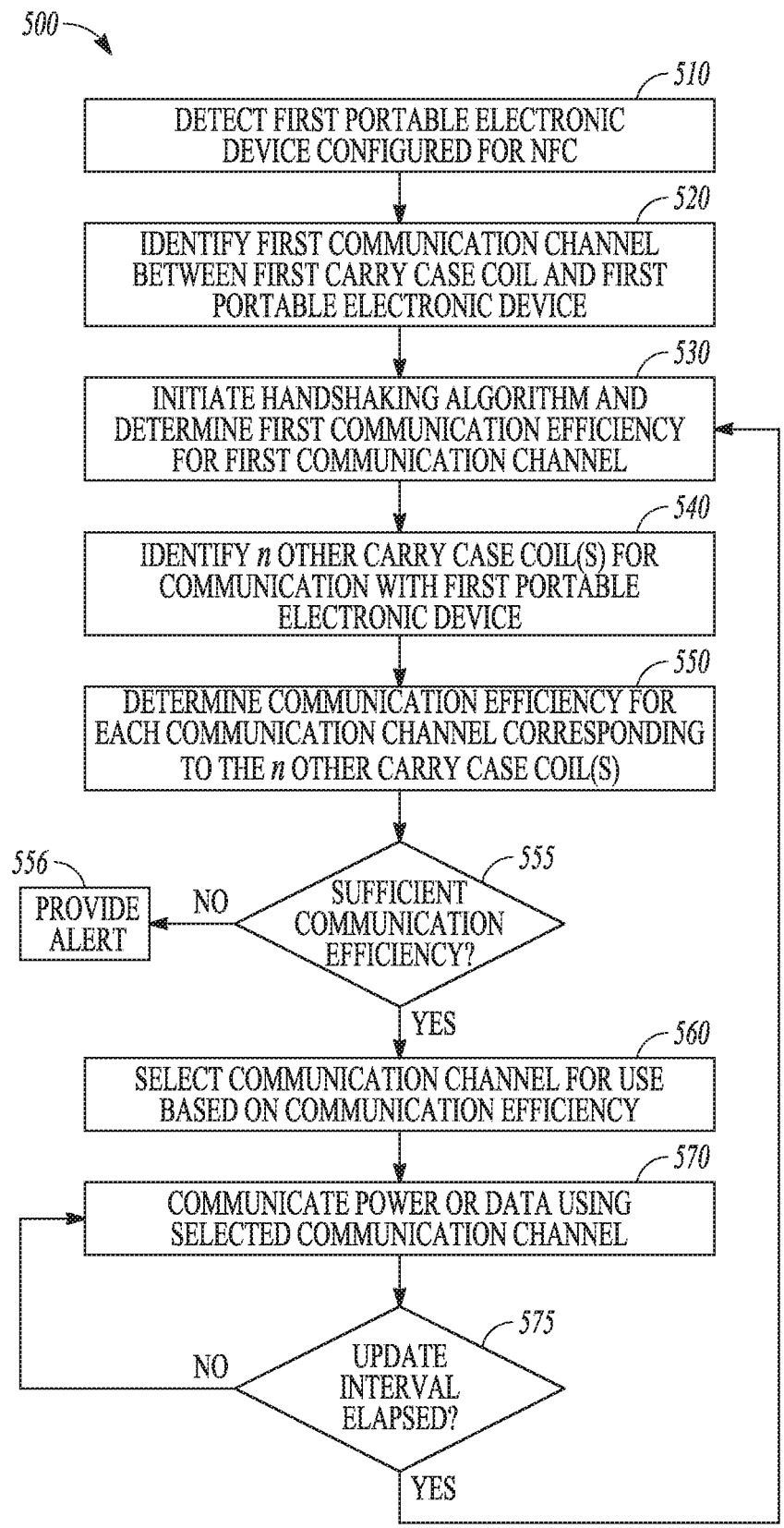
FIG. 5 illustrates generally an example that includes configuring a multiple coil system for power or data communication with a first portable electronic device

FIG. 5 illustrates generally an example that can include configuring a multiple coil system in the carry case 100 for power or data communication with a first portable electronic device, such as can be positioned in or near the carry case 100. At 510, the example includes detecting a presence of the first portable electronic device at or near the carry case 100. The first portable electronic device can be detected using a physical sensor, a wireless communication activity sensor, or other sensor. In an example, the first portable electronic device includes at least one coil or other component that is configured for NFC. The first portable electronic device can be configured for receiving or providing at least power or data using NFC.

At 520, the example includes identifying a first communication channel. A communication channel generally includes at least first and second coils, corresponding to respective first and second devices, that can be inductively coupled for power or data communication. In an example, the at least first coil or at least second coil can include multiple coils in a coil array, such as the first panel coil array 401. The multiple coils can be overlapping or otherwise arranged to provide an aggregate coil or aggregate communication field. Identifying the first communication channel at 520 can include using the control circuit 110 to identify an address of at least a first carry case coil that is available for use with the detected first portable electronic device.

At 530, the example includes using the control circuit 110 to initiate a handshaking algorithm between the first portable electronic device and the first carry case coil. The handshaking algorithm can include, among other things, a process for identifying a communication protocol, such as using NFC or using one or more other available wireless communication protocols such as WiFi or Bluetooth. The handshaking algorithm can include establishing power or data communication parameters for use over the identified first communication channel. The power or data communication parameters can include, among other things, a power signal strength or voltage amplitude, a signal duration or signal burst length, a frequency, a frequency change parameter, or a security code or other encryption or device verification parameter. In an example, the handshaking algorithm can include a verification that a device already has a minimum power or charge level to support the handshaking or other diagnostics required to support NFC of power or data.

At 530, the example includes using one or both of the first portable electronic device and the control circuit 110 to determine a communication efficiency for the first communication channel. The communication efficiency can represent a quality of service or a quality of a power or data exchange between the first carry case coil and the first portable electronic device. In an example, the communication efficiency provides an indication of how much power transmitted from one of the first carry case coil and the first portable electronic device is received by the other. In an example, the communication efficiency provides an indication of a data error rate.

At 540, multiple other carry case coils that can optionally be used for communication with the first portable electronic device can be identified, such as using the control circuit 110. That is, the control circuit 110 can, in turn, attempt to communicate with the first portable electronic device using multiple different coils in the carry case 100. A different communication channel can be established between each of the multiple other carry case coils, or combinations of carry case coils, and the first portable electronic device. At 550, the control circuit 110 can determine a communication efficiency for each of the different communication channels. In some examples, only the first carry case coil may be available for use, and steps 540 and 550 can be bypassed.

At 555, the communication efficiency of each communication channel can be analyzed, such as using the first portable electronic device or the control circuit 110, to determine whether any of the available communication channels meet a minimum threshold efficiency. If a channel's communication efficiency is determined to meet or exceed the minimum threshold efficiency, then power or data communication can commence using that channel. If, however, the communication efficiency for each of the available channels is determined to be less than the minimum threshold efficiency, then power or data communication can be suspended or inhibited, and an alert can optionally be provided at 556.

In an example, the minimum threshold efficiency is specified by a user, or is pre-set for one or both of the control circuit 110 and the first portable electronic device. A minimum threshold efficiency can include, for example, a minimum power transfer percentage, or a maximum error rate. In an example, at 535, if the minimum power transfer percentage is not reached, then an alert can be provided at 536. If the minimum power transfer percentage is reached or surpassed, then the example of FIG. 5 can continue at 560.

At 556, providing an alert can include providing an alert using one or more of the carry case 100, the control circuit 110, or the first portable electronic device. For example, the carry case 100 can optionally include a visual or audible alert system. The system can include an audio speaker, a display, or a light or other audiovisual cueing means. The alert can include, among other things, an indication to a user that the first portable electronic device is not configured for use with the carry case 100. In an example, the alert includes an indication to a user that the first portable electronic device is poorly positioned, or the alert can suggest changing a position of the first portable electronic device to facilitate more efficient communication.

Providing the alert at 556 using the control circuit 110 can include using a communication circuit, coupled to the control circuit 110, to provide information about the communication efficiency to an external device. The external device can include, among other things, a smart phone, tablet, or other device that is wirelessly communicatively coupled with the control circuit 110. In response to the alert, the external device can report to a user the information about the communication efficiency, or can alert the user that the first portable electronic device should be repositioned to facilitate more efficient communication. The external device can optionally communicate with the control circuit using WiFi, Bluetooth, or some other wireless communication protocol.

Providing the alert at 556 using the first portable electronic device can include using a visual or audible alert system that is integrated with the first portable electronic device. For example, the first portable electronic device includes a tablet PC. In response to receiving the alert, the tablet PC can sound an audible alert and/or display a message using its graphical user interface. The audible or visual alert can be configured to get a user's attention so that the user is notified that the tablet PC should be repositioned.

If at least one communication channel is determined to be sufficiently efficient, then the example of FIG. 5 continues at 560 with selecting a communication channel for use based on the determine communication efficiencies of the available channels. For example, a most efficient power communication channel can be selected. In an example, different communication channels can be selected for power and data communication. At 570, power or data can be communicated using the selected channel, and an interval timer can be initiated.

At 575, an interval timer can be checked to determine if an update interval is elapsed. The update interval can be specified to indicate a duration after which to re-evaluate the communication efficiency of the communication channel that is in use. If the update interval has not elapsed, then the example can continue communicating using the prior selected communication channel. If the update interval has elapsed, then the example can return to 530 and the selected communication channel (now the "first" communication channel) can be re-evaluated. If the communication efficiency has changed, such as due to shifting of the contents (e.g., source and/or target device(s)) of the car case 100, then a new communication channel can be automatically selected. In an example, the update interval is on the order of several seconds or less.

Figure 6A:
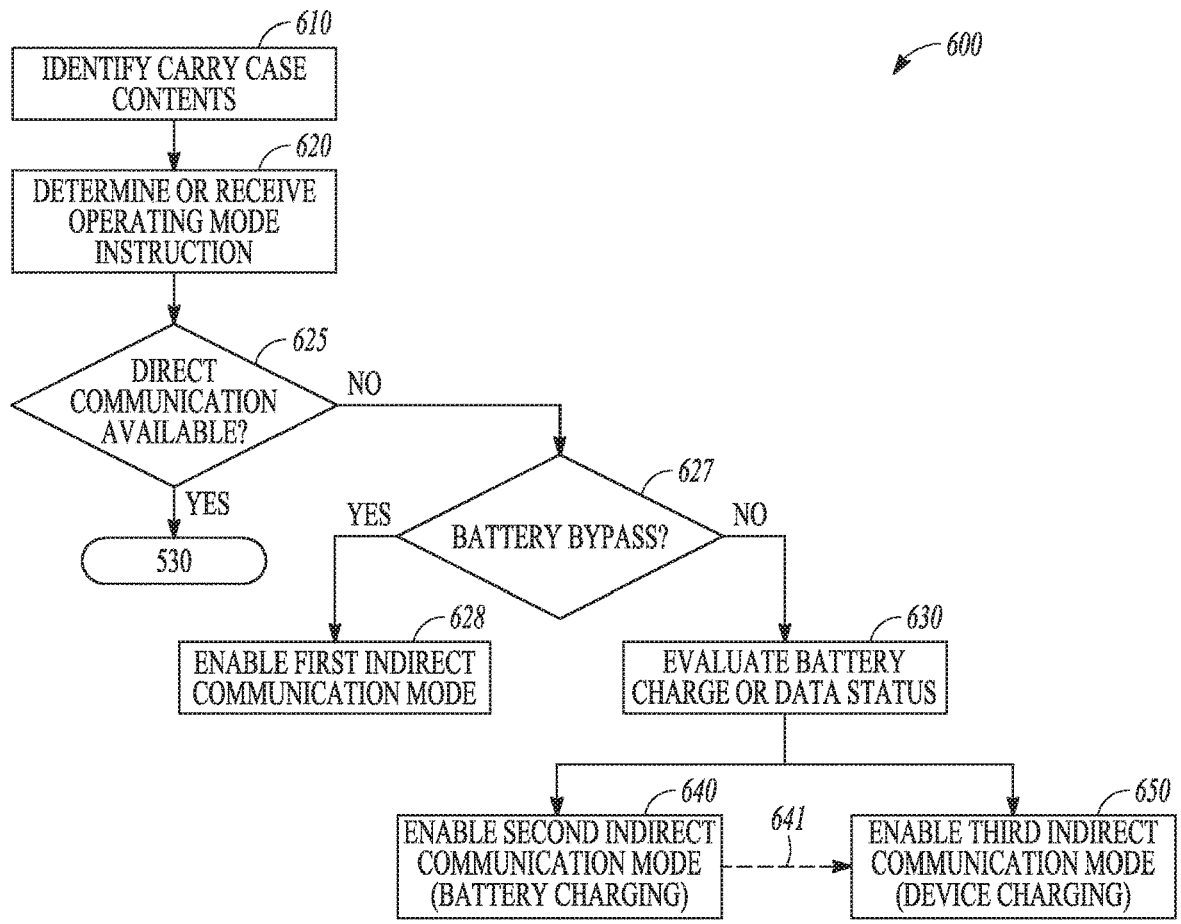
FIG. 6A illustrates generally an example of a method that includes selecting an operating mode.

The carry case 100 can facilitate NFC between two or more devices according to multiple different modes, as mentioned above. FIG. 6A illustrates generally an example of a method 600 for determining which of the multiple different modes to use. FIGS. 7, 8, 9A, and 9B illustrate generally examples of the multiple different modes that can be made available using a carry case. The examples of FIGS. 7, 8, 9A, and 9B refer to different configurations corresponding to different example carry cases 700, 800, and 900, however, the examples can be combined such that a single carry case can operate in one or more of the modes.

In the example of FIG. 6A at 610, the example includes identifying contents of a carry case, such as the carry case 100. In an example, identifying the contents includes identifying any active devices that are in or near the carry case 100 and are configured for NFC communication with one or more coils in the carry case 100. Identifying the contents at 610 can include sending a beacon or ping signal using the control circuit 110, such as using an NFC coil, WiFi antenna, Bluetooth antenna, or other wireless communication component, and then listening for a response from one or more devices. Identifying the contents at 610 can include gathering device parameter information from the identified contents. For example, device ID information, charge status information, or device communication protocol information can be shared with the control circuit 110 and/or other active devices at 610. In an example, identifying the contents at 610 includes determining whether an identified device is a source device (e.g., a device that has available power and/or data) or a target device (e.g., a device that is requesting power and/or data).

Figure 6B:
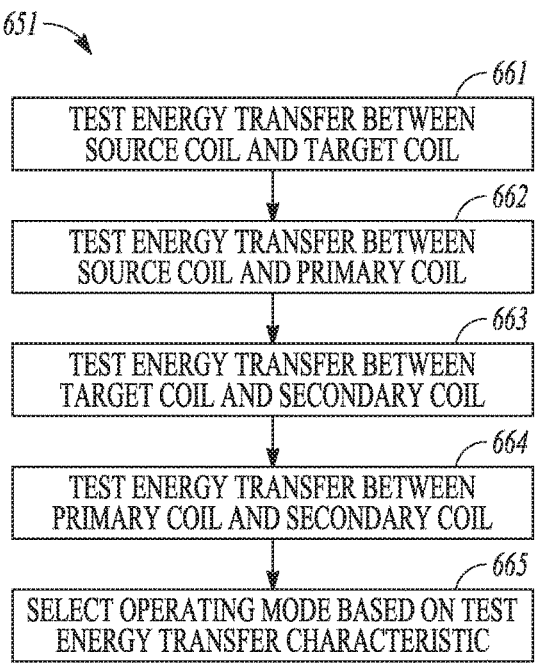
FIG. 6B illustrates generally an example of using test energy to select an operating mode.

At 620, the example includes automatically determining an operating mode, or receiving an operating mode instruction from a user. Receiving an operating mode instruction from a user can include receiving the instruction from a user via a device that was identified at 610, or receiving the instruction using another device or interface that is coupled with the carry case 100 or the control circuit 110. For example, a tablet PC or smart phone that is in data communication with the control circuit 110 can be used to receive an operating mode instruction from a user. FIG. 6B, described below, illustrates an example of automatically determining an operating mode using test energy that is exchanged between multiple coils. In an example, a test energy includes a low amplitude, low power, and relatively short duration signal that is used to ascertain an availability or quality of a power and/or data communication channel.

At 625, the example can include determining whether a direct communication mode is available. A direct communication mode can include or use a power or data transmission channel that extends between a source device and a target device, such as without using any intervening or intermediate circuits or conductors. That is, the direct communication mode can include using an NFC coil or source coil that is integrated with a source device to communicate power or data to an NFC coil or target coil that is integrated with a target device. A direct communication mode can be available when the source and target devices are sufficiently proximally aligned such that coils in the respective devices can exchange an NFC signal with at least a specified minimum efficiency.

If a direct communication mode is determined to be available at 625, then at 626 the example can proceed according to step 530, et seq., in the example of FIG. 5. Step 530 at FIG. 5 includes initiating a handshaking algorithm and determining an efficiency for a first communication channel. Thus, when a direct communication mode is available, the handshaking algorithm can be initiated between the source and target devices, and an efficiency of the communication channel between the source and target devices can be determined. The example can continue according to the example of FIG. 5, for example, at 540 to identify whether an alternative, indirect communication channel is available and whether such alternative channel can provide more efficient communication. If the direct communication channel is determined to be sufficiently efficient, then communication using the direct channel can commence.

Referring now to FIG. 6B, an operating mode can be selected based on tests performed using multiple different NFC coils available in a system. FIG. 6B includes an example 651 that includes a source device having a source coil, a target device having a target coil, a primary coil that is configured to exchange energy with the source device, and a secondary coil that is configured to exchange energy with the target device. At 661, the example includes inductively transferring a test energy between the source coil and the target coil, such as to determine whether inductive communication is available directly between the source device and the target device. In an example, transferring the test energy between the source coil and target coil can include exchanging device configuration information such that one or both of the source and target devices can determine whether they are compatible for exchanging power or data.

At 662, the example includes inductively transferring a test energy between the source coil and the primary coil, such as to determine whether inductive communication is available between a carry case coil and the source coil. In an example, the test energy transfer at 662 is used to identify a presence of a source device, or to ascertain one or more characteristics of a source device. At 663, the example includes inductively transferring a test energy between the secondary coil and the target coil, such as to determine whether inductive communication is available between a carry case coil and the target coil. In an example, the test energy transfer at 663 is used to identify a presence of a target device, or to ascertain one or more characteristics of a target device. At 664, the example includes inductively transferring a test energy between the primary coil and the target coil, such as to determine whether an energy transfer circuit or communication circuit in a carry case is operational.

At 665, the example includes selecting an operating mode based on the results of at least one of the energy transfer tests 661-664. A result can include an acknowledgement of receipt of a signal, an efficiency characteristic of a power transfer, an accuracy of a data transfer, or other characteristic of a wireless inductive communication.

Although the example of FIG. 6B shows a particular sequence for evaluating the coils available in the system. Other sequences can similarly be used, or steps corresponding to particular operating modes can be omitted. For example, the test energy transfer between the source coil and the target coil can be omitted if it is known or assumed that a direct inductive link is unavailable or undesirable. By omitting one or more of the test energy steps, time and energy can be conserved.

Figure 7:
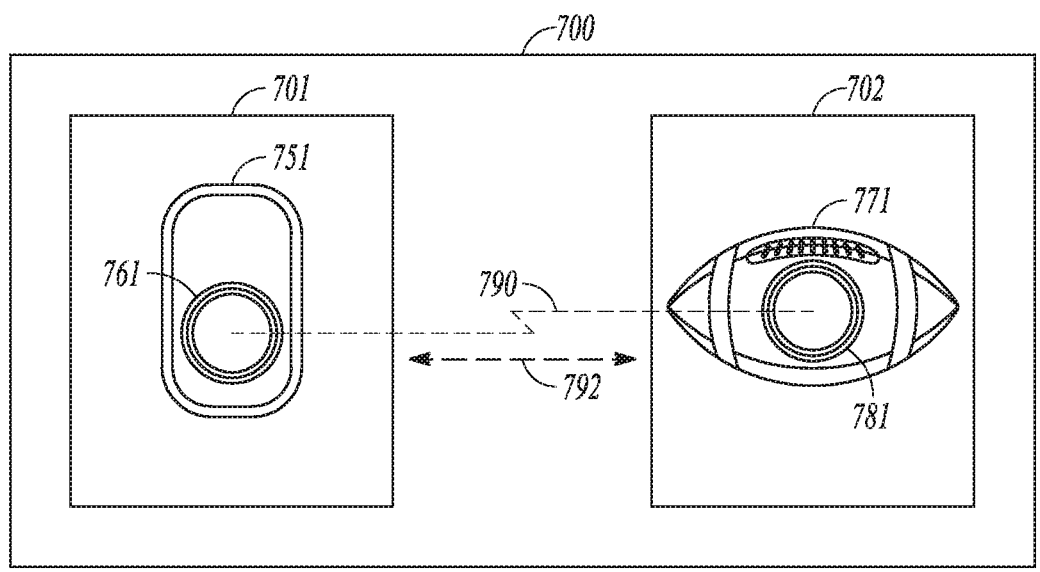
FIG. 7 illustrates generally an example of a direct inductive communication mode.

FIG. 7 illustrates generally an example of a direct communication mode. The example of FIG. 7 includes a direct mode carry case 700. Similarly to the carry case 100 described above, the direct mode carry case 700 includes multiple compartments, such as can be physically separated using one or more partitions inside of an otherwise unitary case. The direct mode carry case 700 includes a first source device compartment 701 and a first target device compartment 702 such as corresponding to the first and second device compartments 101 and 102 in the example of the carry case 100.

FIG. 7 includes a first source device 751 having a first source coil 761, and a first target device 771 having a first target coil 781. When the first source device 751 and the first target device 771 are positioned in or near the direct mode carry case 700, the first source coil 761 and the first target coil 781 can be aligned, or encouraged toward an aligned configuration, such that wireless inductive communication is possible between the devices. For example, the direct mode carry case 700 can include compartment features or cradles that align the first source device 751 and the first target device 771 toward a predetermined orientation when the devices are inserted into the direct mode carry case 700.

In the example of FIG. 7, a first wireless inductive communication channel 790 is established between the first source coil 761 and the first target coil 781. Power and/or data can be communicated bi-directionally 792 between the first source device 751 and the first target device 771. For example, a power signal can be transmitted from the first source device 751 to the first target device 771 using the first communication channel 790, and a data signal can be transmitted from the first target device 771 to the first source device 751 using the same communication channel. In an example, the bi-directional first communication channel 790 can be used for initial handshaking between the devices, for power or data signal transfer, or for exchanging status information during a power or data signal transfer that uses the same or a different channel.

Returning to FIG. 6A, if a direct communication channel is not available between source and target devices, then the method 600 can continue at 627. At 627, the example includes determining whether a carry case battery is to be bypassed. In an example that includes a carry case without an available or integrated battery, the method 600 proceeds to 628. In other examples, a user input or other setting (e.g., received at the control circuit 110) can instruct the control circuit 110 to bypass an available or integrated battery and proceed to 628.

Figure 8:
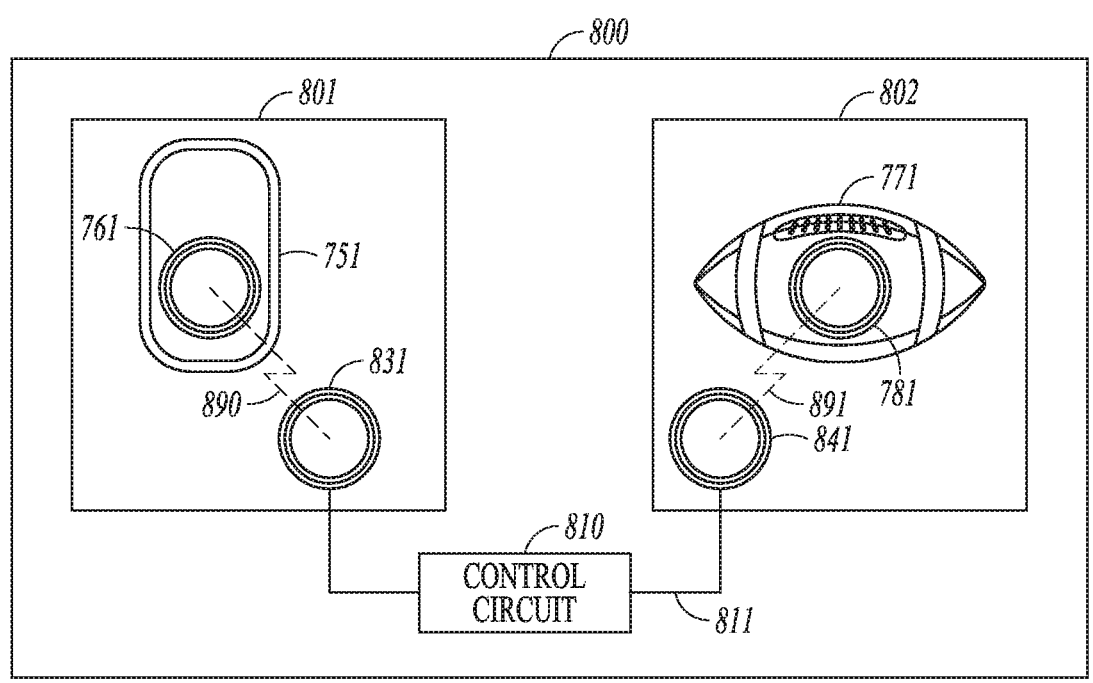
FIG. 8 illustrates generally an example of an indirect inductive communication mode.

At 628, the example includes enabling a first indirect communication mode between a source device and a target device. FIG. 8 illustrates generally an example of a first indirect communication mode. The example of FIG. 8 includes a first indirect mode carry case 800. The first indirect mode carry case 800 includes a source device compartment 801 with an input coil 831, and the first indirect mode carry case 800 can include a target device compartment 802 with an output coil 841. The first source device 751 and the first target device 771 are illustrated as being located in the source device compartment 801 and in the target compartment 802, respectively. A first wireless inductive communication channel 890 can be established between the input coil 831 and the first source coil 761 of the first source device 751. A second wireless inductive communication channel 891 can be established between the output coil 841 and the first target coil 781 of the first target device 771.

In the example of FIG. 8, the input coil 831 and the output coil 841 are coupled by way of a communication circuit 811 that is, at least in part, non-wireless. That is, all or a portion of the communication circuit 811 is wired or includes physical tangible conductors for communicating electrical energy between the input coil 831 and the output coil 841. Power and/or data can be communicated bi-directionally between the first source device 751 and the first target device 771 using the communication circuit 811.

In an example, a control circuit 810 is coupled to the communication circuit 811, and the control circuit 810 is configured to facilitate communication between the first source device 751 and the first target device 771. For example, the control circuit 810 can be configured to receive a power signal from the input coil 831 at a first frequency and first power level, and then convert the power signal to a second frequency or a second power level before sending the signal to the output coil 841. The control circuit 810 can similarly receive a data signal having a first format from the first source device 751, and then the control circuit 810 can process or convert the data signal for a second format suitable for the first target device 771.

In an example, the communication circuit 811 includes a power storage circuit or memory circuit for temporarily storing a power signal or an information signal. In an example, the communication circuit 811 is substantially or entirely passive and includes only passive electrical conductors that exchange electrical signals between the input coil 831 and the output coil 841.

Returning to FIG. 6A, if a battery bypass is not indicated at 627, then the method 600 can continue at 630. At 630, the example includes evaluating a battery charge or data status for any one or more of the devices identified at 610. Information about a battery charge status can be used to determine which of the identified devices is to be used as a source device and which is to be used as a target device. Similarly, information about a data status can be used to determine which of the identified devices has information or share, or to determine which of the identified devices has sent a request for information, such as information from the carry case 100 itself or from one or more of the other available devices.

Based on information about a battery charge or data status, and information about which devices are in communication with the carry case 100, the control circuit 110 can select at least a second indirect communication mode at 640 or a third indirect communication mode at 650. The second indirect communication mode is illustrated generally at FIG. 9A, and the third indirect communication mode is illustrated generally at FIG. 9B. In the second indirect communication mode, a power storage circuit or memory circuit, such as integrated with or coupled to the carry case 100, can be charged by or can receive information from a source device. In the third indirect communication mode, a power storage circuit or memory circuit, such as integrated with or coupled to the carry case 100, can release a power signal or information for delivery to a target device.

For example, evaluating the battery charge status at 630 can include identifying a fully charged battery in first device, and a identifying a nearly depleted (e.g., 10% charged) battery in a second device. In this example, the carry case 100, such as using the control circuit 110, can instigate a power transfer and designate the first device as a source device and can designate the second device as a target device. The power transfer can proceed, for example, according to the method described in FIG. 5, such as using the second indirect communication mode 640 or the third indirect communication mode 650.

In an example, a power transfer from a source device to a target device includes using the second and third indirect communication modes at 640 and 650. At 640, the example can include receiving a power signal from the source device using a battery that is integrated with the carry case 100. The power signal can optionally be substantially simultaneously provided from the battery to the target device. In an example, the power signal is stored by the battery. At 641, such as in response to a power request from the target device, or in response to a control signal issued by the control circuit 110, the power signal can be dispensed at 650 to the target device, such as using the third indirect communication mode.

In an example, evaluating a data status at 630 includes identifying information from a first device that is to be shared with one or more other devices, and the one or more other devices may or may not be present, or the one or more other devices may not be in contemporaneous data communication with the carry case 100 and/or with the first device. In this example, a data transfer can be initiated at 640 between the first device and a memory circuit or other data processing circuit that is coupled with the carry case 100. The memory circuit, or other data processing circuit, can be configured to receive the information from the first device and retain the information until one or more other devices request the information.

Figure 9A:
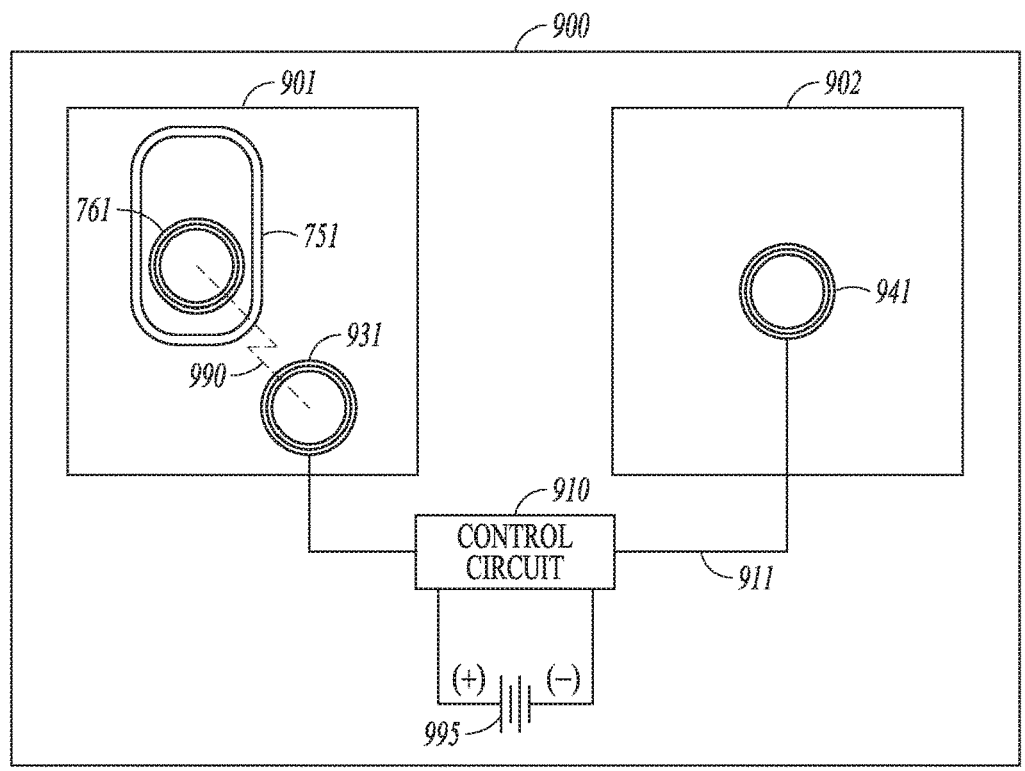
FIG. 9A illustrates generally an example of an indirect inductive communication mode.

FIG. 9A illustrates generally an example of the second indirect communication mode for a carry case 900. In the example of FIG. 9A, the first source device 751 communicates power or information to a control circuit 910. A power signal or data signal is transferred from the first source coil 761 to an input coil 931 using a first wireless inductive communication channel 990. The power signal or data signal received at the input coil 931 is transferred inside the carry case 900 using a communication circuit 911, such as a conductor or other wired mode or circuit configured for power signal or data signal transfer. The communication circuit 911 can be coupled to the control circuit 910 or to another circuit that is integrated with or coupled to the carry case 900. For example, a power signal received by the input coil 931 can be sent via the communication circuit 911 to a first battery 995, such as according to instructions from the control circuit 910. A target device need not be present for power or data communication to occur between the first source device 751 and another circuit that is integrated with or coupled to the carry case 900. In an example, the first battery 995 includes one or more of a rechargeable power pack, such as comprising a lithium ion, sodium ion, aluminum graphite, aluminum air, or other type of battery.

Figure 9B:
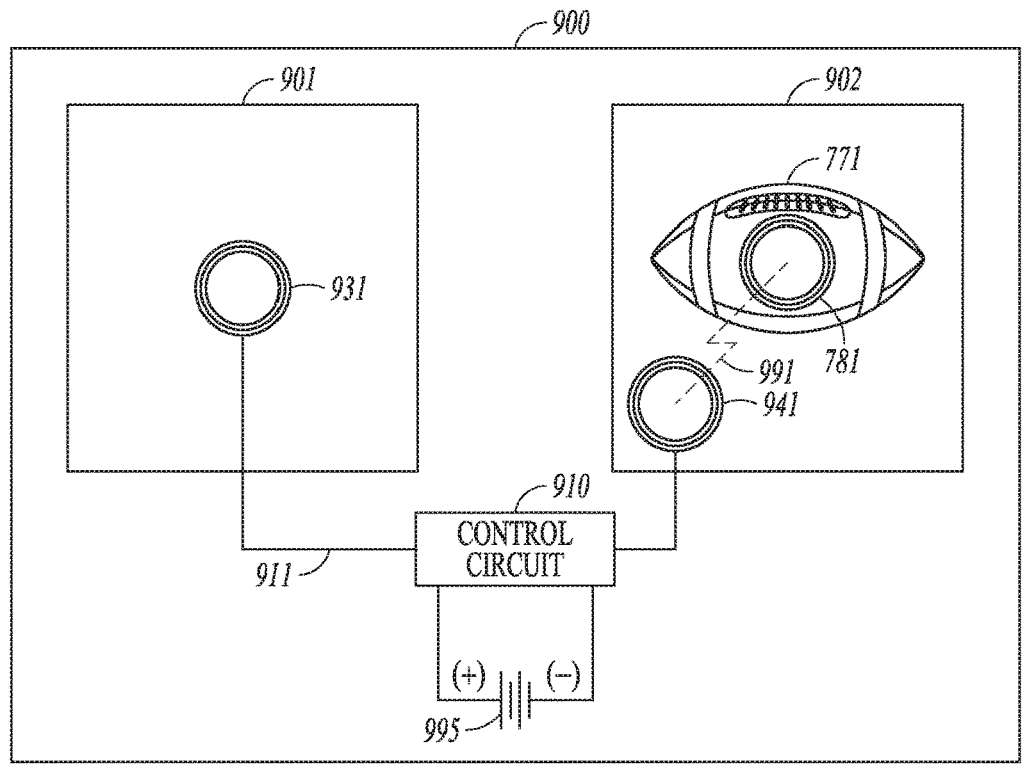
FIG. 9B illustrates generally an example of an indirect inductive communication mode.

FIG. 9B illustrates generally an example of the third indirect communication mode for the carry case 900. In the example of FIG. 9B, the first target device 771 receives power or information from the control circuit 910, or from another circuit that is integrated with or coupled to the carry case 900. A power signal or data signal is transferred from the control circuit 910 (or other circuit) using the communication circuit 911 to the output coil 941. The power signal or data signal received at the output coil 941 is then transmitted to the first target device 771 using a second wireless inductive communication channel 991. A source device need not be present for power or data communication to occur between the first target device 771 and another circuit, such as the battery 995, that is integrated with or coupled to the carry case 900.

The examples of FIGS. 7, 8, 9A, and 9B can be extended to include multiple carry case compartments other than those illustrated. For example, the carry case 900 can optionally include a third compartment that is configured to receive another portable wireless device, and an additional input/output coil can be provided to interface with a device in the third compartment. The additional coil can be coupled to the control circuit 910, and can be similarly configured to send or receive wireless inductive power or information signals using a device in the third compartment. Although the examples of FIGS. 7, 8, 9A, and 9B are shown as having a single coil integrated with each compartment, multiple coils can be provided for any one or more of the compartments. For example, any of the compartments can include an array of coils, such as can include coils in multiple different planes (see, e.g., the discussion of FIGS. 3, 4, and 5).

Figure 10:
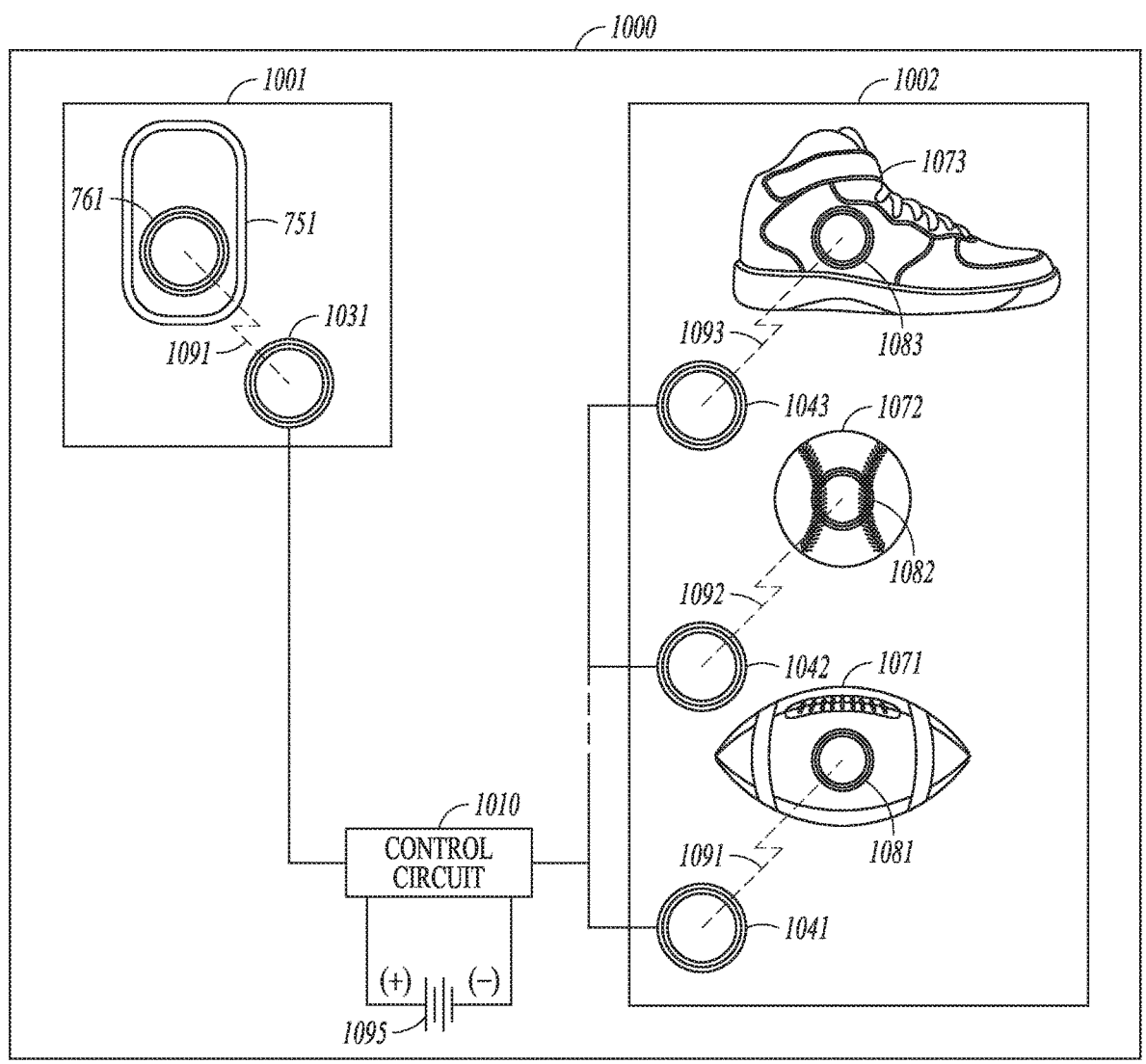
FIG. 10 illustrates generally an example of a carry case with multiple target devices.

FIG. 10 illustrates generally an example of a carry case 1000 that includes at least first and second compartments 1001 and 1002. In the example of FIG. 10, the first compartment 1001 includes an input coil 1031. The input coil 1031 is configured to wirelessly inductively communicate with the first source coil 761 of the first source device 751 using a first inductive communication channel 1091. The example of FIG. 10 further includes a control circuit 1010 and a battery 1095. Power and/or information signals can be sent to or received from the first source device 751, such as using the control circuit 1010 and using the first inductive communication channel 1091.

The second compartment 1002 includes multiple output coils. In the example of FIG. 10, the second compartment 1002 includes at least first, second, and third output coils 1041, 1042, and 1043. The first, second, and third output coils 1041, 1042, and 1043 can optionally be arranged in different planes, or can be configured as aggregates of multiple coils, such as using coils from different coil arrays. Each of the multiple output coils can be communicatively coupled (e.g., using a physical wired connection) with the control circuit 1010. As a result, a power or information signal from the control circuit 1010 can be directed or addressed to any one or more of the first, second, and third output coils 1041, 1042, and 1043. Additional or fewer coils can optionally be used.

In the example of FIG. 10, the second compartment 1002 includes multiple portable electronic devices, and each of the multiple devices includes a coil for NFC. For example, the second compartment 1002 includes a first device 1071, a second device 1072, and a third device 1073. The first, second, and third devices 1071, 1072, and 1073 include respective first, second, and third device coils 1081, 1082, and 1083. The first device coil 1081 can be communicatively coupled with the first output coil 1041 using a first wireless inductive communication channel 1091, the second device coil 1081 can be communicatively coupled with the second output coil 1042 using a second wireless inductive communication channel 1092, and the third device coil 1083 can be communicatively coupled with the third output coil 1043 using a third wireless inductive communication channel 1093.

The first, second, and third communication channels 1091, 1092, and 1093 can communicate power or information signals simultaneously in parallel, or the channels can communicate power or information signals serially, such as under the control of the control circuit 1010. In an example, the control circuit 1010 can automatically evaluate a communication efficiency for different pairs of operable communication channels to evaluate whether simultaneous operation is inhibiting power or data transfer efficiency. In an example, the control circuit 1010 can selectively disable one or more of the communication channels, or can schedule a power or data transfer, to increase transfer efficiency and reduce consumption of available power assets.

Figure 11:
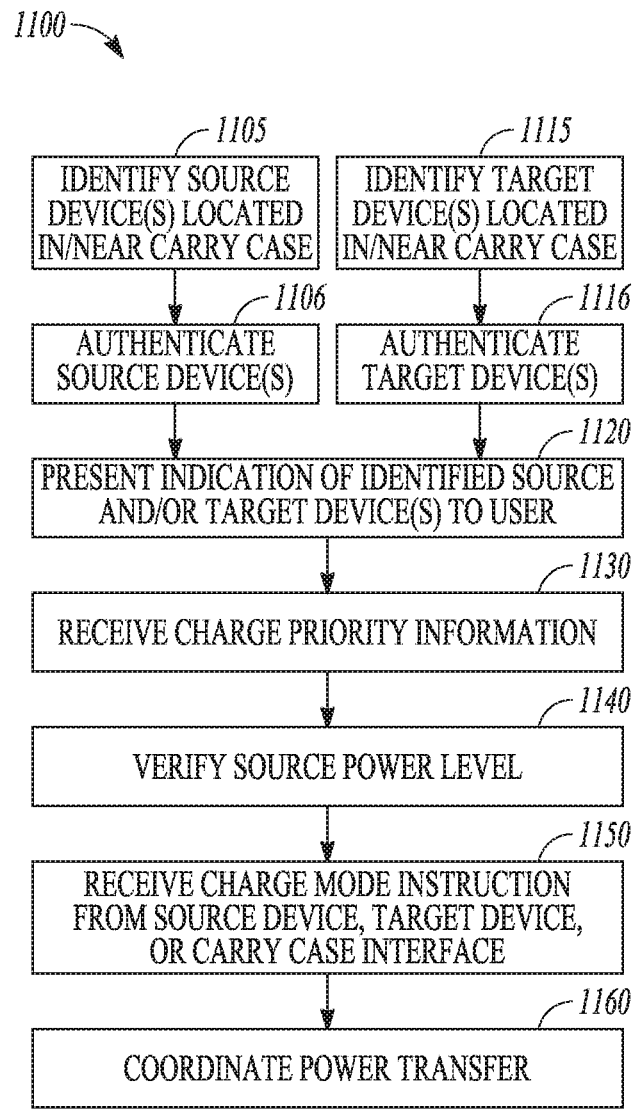
FIG. 11 illustrates generally an example that includes coordinating a power transfer among multiple portable electronic devices.
Figure 12:
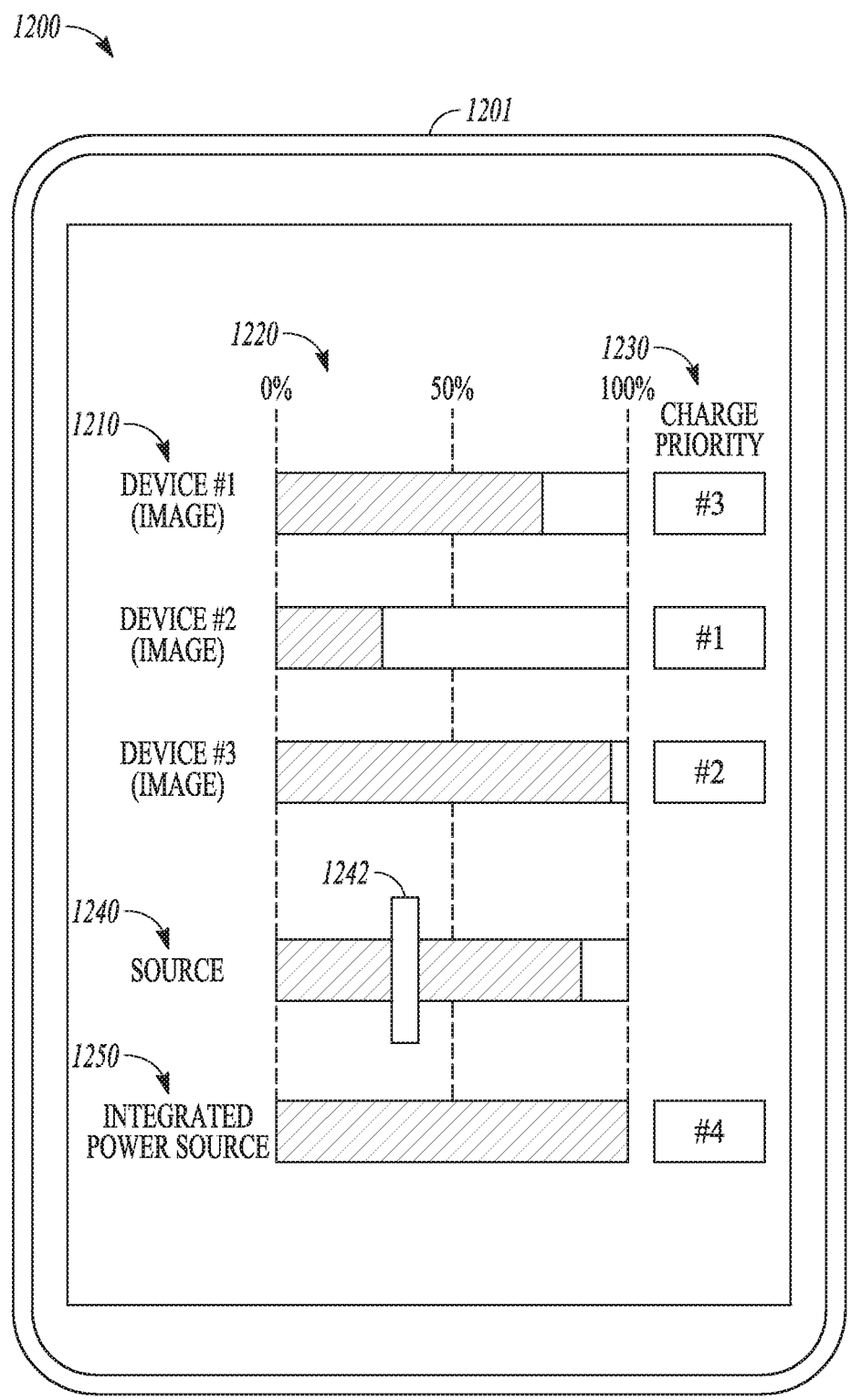
FIG. 12 illustrates generally an example of a device interface for coordinating a power or data transfer.

FIG. 11 illustrates generally an example 1100 that can include coordinating a power transfer among multiple portable electronic devices, such as among the multiple devices in the carry case 1000 in the example of FIG. 10. Although the example 1100 is described in terms of a power transfer, a similar example can be provided for a data transfer where data can be apportioned between multiple devices. FIG. 12 illustrates generally an example of a device interface 1200 that can be used to display information to a user, or to receive information from a user, about a power or data transfer. For example, portions of the example 1100 of FIG. 11 can be carried out using the device interface 1200 of FIG. 12. The device interface 1200 can correspond to an interface of the first source device 751, an interface on one of the first, second, or third devices 1071, 1072, 1073, or an interface of an external device that is communicatively coupled with the control circuit 1010.

The device interface 1200 includes a graphical display portion 1201. Non-graphical or text-only displays can alternatively be used. The display portion 1201 can include, among other things, a device list 1210, device attribute information 1220, such as corresponding to each device in the device list 1210, and priority information 1230. The example of FIG. 12 illustrates generally using the device interface 1200 to display information about a power transfer between multiple devices.

The device list 1210 includes identification information about each of one or more available devices. The device list 1210 can include, among other things, a device name, type, representative image, icon, or other indicia of the available devices. In an example, the device list 1210 can include information about one or more source devices, one or more target devices, or information about a carry case status, such as information about a status of a carry case's integrated battery. In an example, the device list 1210 includes information about a power source 1250 that is integrated with the carry case 1000, such as the battery 1095.

The device attribute information 1220 can include, among other things, an indication of a battery charge level, such as relative to a battery capacity, such as for each of the available devices. In other examples, the device attribute information 1220 includes a list of available data or other information that is stored in the available devices. The priority information 1230 can include a charge priority, such as can be specified by a user, or can be determined automatically, such as using the control circuit 1010. The device attribute information 1220 for each device can be displayed in visual correspondence with the corresponding device indicia in the device list 1210, such as using a table or graphic to visually or pictorially group the information.

In an example, the device interface 1200 includes a communication quality indication. The communication quality indication can provide information to a user about a quality of a wireless inductive connection between each of the available devices and the carry case 100. If the communication quality for a particular device is less than a specified minimum quality, then the user can be alerted to reposition the device. In an example, the communication quality information can be presented to a user using a numerical indication (e.g., 0 to 100%), graphically (e.g., by color-coding another display portion, such as by color coding the device attribute information 1220 in green, yellow, and red to indicate strong, intermediate, and weak communication quality, respectively).

Returning now to the example of FIG. 11, at 1105, the example 1100 includes identifying one or more source devices that are located in or near the carry case 1000. Identifying a source device at 1105 can include receiving device identification information or a power level indication from a first device using the control circuit 1010. If the control circuit 1010 recognizes the device identification information as a source candidate device, and the power level indication exceeds a specified threshold power level, then the control circuit 1010 can designate the first device as a first source device.

At 1115, the example includes identifying one or more target devices located in or near the carry case 1000. Identifying a target device at 1115 can include receiving device identification information or a power level indication from at least a second device using the control circuit 1010. If the control circuit 1010 recognizes the device identification information as a target candidate device, and the power level indication is less than a specified threshold power level, then the control circuit 1010 can designate the second device as a first target device. Optionally, the control circuit 1010 can be configured to recognize multiple different source devices and multiple different target devices at 1105 and 1115.

At 1106 and 1116, the control circuit 1010 can authenticate any source and target devices that were identified at 1105 and 1115. Authenticating a device can include using the control circuit 1010 to analyze a device identification code or a device encryption/decryption key, or authenticating can include recognizing a communication parameter. In an example, authenticating a device can include recognizing a brand or type of device, and then enabling power or data communication only with a specified brand or type of device. In an example, authenticating a device can include recognizing whether a particular NFC-enabled device can communicate using one or more power or data transfer mechanisms that are available to the control circuit 1010. If a non-compatible device is identified, then the authentication at 1106 and 1116 can optionally include providing a user alert. In an example, authenticating a device can include performing a diagnostic examination on an identified source or target device. The diagnostic examination can determine whether an identified device is functioning properly, or if an identified device is operating using a specified version (e.g., a latest version) of an available firmware or software program. In an example, information about the diagnostic examination can be used by the control circuit 1010 to enable to disable wireless inductive communication between the carry case 1000 and a diagnosed device.

At 1120, an indication of the identified source and/or target devices can be presented to or displayed to a user. In an example, the indication of the identified devices is provided to the user using an interface that is integrated with the carry case 1000, such as including an interactive display. In an example, the indication of the identified devices is provided to the user using one of the identified devices, or using an interface of another device that is in data communication with the control circuit 1010, or using an interface of another device that is in data communication with at least one of the devices identified at 1105 and 1106. That is, in an example, user information received at an interface can be communicated to a first device identified at 1105 or 1106, and the user information can be relayed by the first device to the control circuit 1010.

In an example, presenting the indication of the identified source and/or target devices to the user at 1120 includes using the device interface 1200 of FIG. 12. The device interface 1200 can be updated periodically, such as during the device identification and authentication processes 1105, 1115, 1106, and 1116. In an example, an identified device can be selectively enabled or disabled by a user using the device interface 1200. In an example, an authorization or authentication of an identified device can include using information received from a user via the device interface 1200. An authentication code, password, decryption key, or other information can be input into the device interface 1200 by the user and then communicated to the control circuit 1010 for verification. In response, an authenticated or verified device can be added to the device list 1210 for further processing.

In the example of FIGS. 10-12, presenting the indication of the identified source and/or target devices to the user at 1120 can include populating the device list 1210 of the device interface 1200 by providing names, icons, or other indicia to represent the identified devices. For example, "DEVICE #1" can be replaced with a relevant written description (e.g., "Football"), and a corresponding image can be displayed on the device interface 1200. "DEVICE #2" can be replaced with, e.g., "Baseball", and a corresponding image, and so on.

In an example, presenting the indication of the identified source and/or target devices to a user at 1120 can provide an opportunity for a user to verify that each of the devices present in the carry case 1000 is properly recognized. For example, if the user knows that a fourth target device (e.g., a watch) is present in the carry case 1000 but the fourth target device is not presented on the device interface 1200, then the user can be alerted that the device is not communicating with the carry case 1000. In an example, the fourth target device includes a hardware NFC-enabling switch. In response to recognizing that the fourth target device is not present on the device interface 1200, the user can turn on the hardware NFC-enabling switch to permit NFC communication. The user can then refresh the device interface 1200 to attempt to find the fourth target device.

At 1130, charge priority information can be received. Charge priority information can be received from a user, from the control circuit 1010, or from another processor circuit that is configured to determine an order in which to dispense power to the available and authenticated devices. Receiving the charge priority at 1130 can include using the device interface 1200 to receive a user input corresponding to the priority information 1230. The priority information 1230 can include a numerical list that indicates which of the available devices to charge first, or to charge more quickly than the other device(s). In an example, a user can select one of the devices from the device list 1210 and update a corresponding charge priority 1230 using the device interface 1200.

In an example, a charge priority can be automatically determined based on need. For example, the control circuit 1010 can recognize that DEVICE #2 from the example of FIG. 12 has a lowest relative battery level (e.g., about 25% full) as compared to DEVICE #1 (e.g., about 75% full) and DEVICE #3 (e.g., about 95% full). The control circuit 1010 can automatically apportion most or all of an available power signal (e.g., from the first source device 751 and/or from the battery 1095) to DEVICE #2 to replenish its battery.

In an example, a charge priority can be automatically determined based on a device usage pattern. For example, if a control circuit 1010 recognizes that DEVICE #1 is more often used, or more often recharged, than DEVICE #2, then DEVICE #1 can be moved up in the priority list. In an example, a charge priority can be automatically determined based on historical information about a particular device's battery depletion rate. For example, if DEVICE #2 is known to maintain its charge for a relatively long period of time and DEVICE #1 is known to lose its charge more quickly, then charging DEVICE #1 can be prioritized over DEVICE #2.

At 1140, the example 1100 includes verifying a power capacity or power level of a power source. Verifying the power level at 1140 can include measuring an available power level in, for example, the first source device 751 and/or in the battery 1095. If the power level in the first source device 751 and/or in the battery 1095 is insufficient, then an alert can be provided to a user, such as using the device interface 1200.

In an example, a user can select a threshold source battery level at which to inhibit providing further power from a particular source. In the example of FIG. 12, the device interface 1200 includes a SOURCE indication 1241 that shows a relative charge or power level of a source device. A slider 1242, such as can be movable by a user using the device interface 1200, is graphically provided to indicate a threshold power level. If the source power level is determined to be less than the threshold power level, then the control circuit 1010 can inhibit providing further power from the source device. In an example, a user can override the threshold power level to continue depleting the source device's available power and to continue charging one or more target devices. In an example, the system can include a "life preserver" function that maintains a specified minimum charge level for any one or more of the devices, notwithstanding a user override or a position of the slider 1242. Devices using the "life preserver" function can be depleted to some specified minimum charge level that can preserve some device functions, such as for some specified duration. In an example that includes a smart phone, a "life preserver" function can prevent the phone battery from being depleted below 5%, such as to ensure the smart phone is operable for at least several additional minutes, such as after providing a visual or audible alert to a user about the smart phone battery status.

At 1150, the example 1100 can include receiving a charge mode instruction from a source device, a target device, or from the device interface 1200. For example, receiving the charge mode instruction can include receiving an instruction to charge the battery 1095 using the first source device 751. Receiving the charge mode instruction can include receiving an instruction to use the battery 1095 to charge one or more available target devices, such as according to a user preference, according to a priority scheme identified by a user, or according to an automatically determined priority scheme that is based on target device battery level status or charge efficiency characteristics. Receiving the charge mode instruction at 1150 can optionally include testing one or more available charge modes to identify a preferred charge mode, such as according to the example of FIG. 6B. Some examples of possible charge modes are illustrated generally at FIGS. 7, 8, 9A and 9B. At 1160, the example 1100 includes coordinating or carrying out the power signal transfer according to the received charge mode instruction at 1150.

Figure 13:
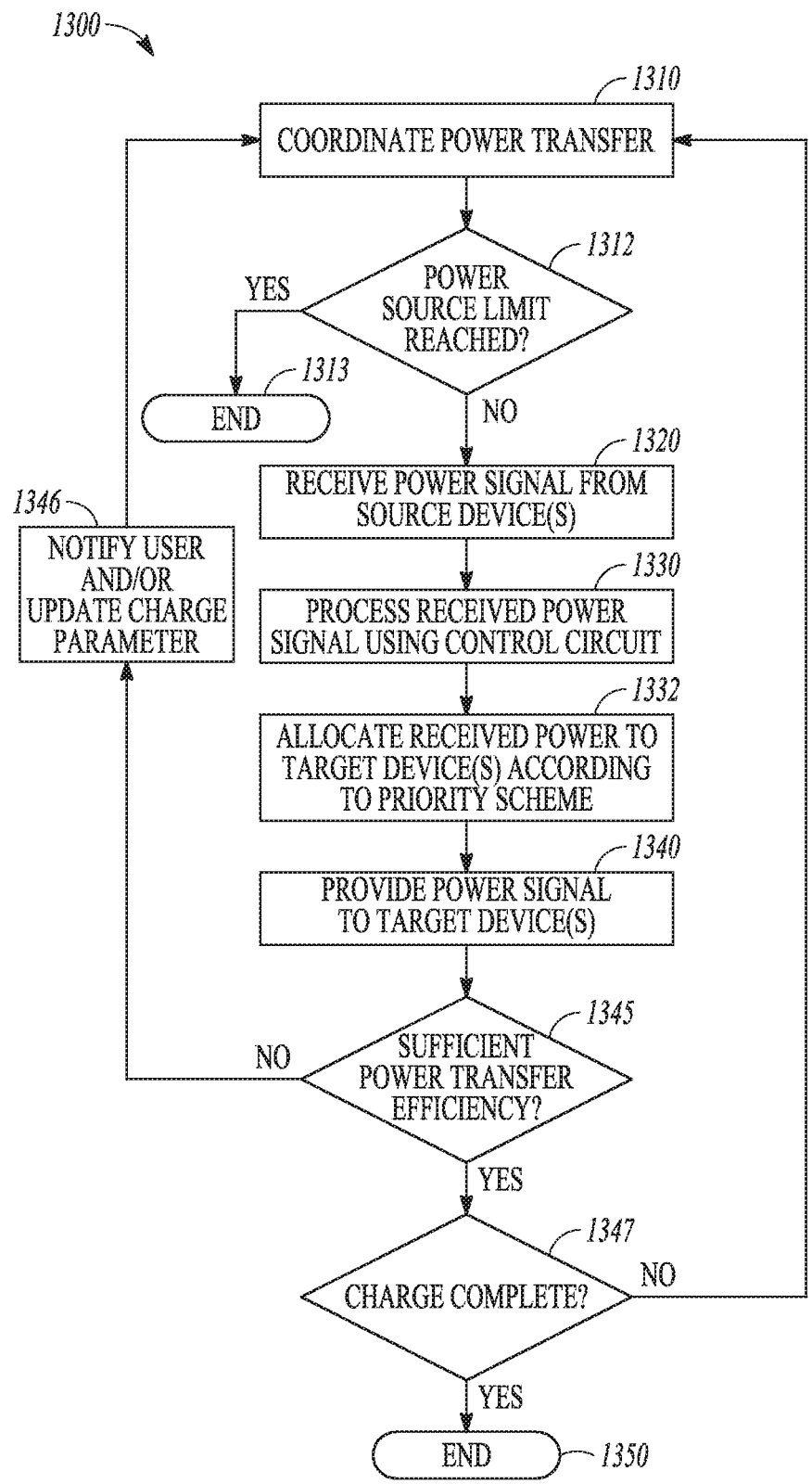
FIG. 13 illustrates generally an example of a power signal transfer method.

With a communication channel established for use at 1160, a power signal transfer example continues at 1310 in an example 1300 of FIG. 13. In an example, coordinating the power transfer at 1310 can include identifying whether a target device charge threshold is met. If the charge threshold is met, then the power signal transfer can terminate. If the charge threshold is not met, then the power signal transfer can continue.

At 1312, the example includes determining whether a power source limit is reached. For example, an internal battery in a source device can be protected from depleting its charge to less than some specified minimum charge. If the internal battery charge level is at or below the specified minimum, then the power signal transfer can be inhibited by the control circuit 1010, or by the source device itself, and the process can end at 1313. If the internal battery charge level exceeds the specified minimum, then the power signal transfer can continue at 1320. At 1320, a power signal is received at the control circuit 1010, or at another power signal processing circuit. The power signal is received from one or more source devices, such as from the first source device 751, the battery 1095, or another source device.

At 1330, the received power signal is processed using the control circuit 1010 or using another power signal processing circuit. Processing the received power signal can include, among other things, changing a power signal amplitude, frequency, pulse width, waveform shape, or other characteristic of the received power signal before the power signal is provided to one or more target devices at 1340. In an example, the source device can release power according to a specified power signal discharge algorithm. The control circuit 1010 can receive the power signal according to the discharge algorithm, optionally temporarily store the power signal, and then provide a power signal to a target device according to a specified power signal charge algorithm that is particular to the target device. Parameters of the different discharge and charge algorithms can include changing signal amplitudes, frequencies, waveform morphologies, or other characteristics.

At 1332, the received power signal can be allocated to one or more target devices. For example, the priority information 1230, such as specified by a user, can be used by the control circuit 1010 to determine a power signal, or portion of a power signal, to allocate to the one or more target devices at 1340.

At 1345, a power signal transfer efficiency characteristic can be determined. The power signal transfer efficiency can be based on, among other things, an alignment of the source and target devices with each other or with respective input and output coils in the carry case 1000. An example of determining a power signal transfer efficiency characteristic is described above in the example of FIG. 5, at 530. In the example of FIG. 13, if the power transfer efficiency is less than a specified threshold efficiency, then the example proceeds at 1346 with notifying a user (e.g., using the device interface 1200) or with updating a charge parameter.

Updating a charge parameter at 1346 can include selecting a different output coil from among two or more available output coils. For example, if a target device location has shifted, such as due to movement of the carry case 1000, then an output coil corresponding to an actual location of the shifted target device can be selected for use, for example, automatically using the control circuit 1010. Updating a charge parameter at 1346 can include using a different power signal transfer characteristic. For example, an output signal amplitude can be increased, an output signal frequency can be changed, or an output signal waveform can be changed, such as to attempt to improve the power signal transfer efficiency. With the updated charge parameter at 1346, the example 1300 can continue at 1310 with coordinating the power transfer.

If the power signal transfer efficiency characteristic determined at 1345 is sufficient, or above a specified threshold, then the example 1300 continues at 1347. At 1347, the control circuit 1010 and/or the target device receiving the power transfer can determine whether a charge event is completed. For example, if a target device power storage circuit is filled to capacity, then the charge event can be considered to be completed. In an example, a user can specify a charge or power level target for a particular device, such as using the device interface 1200. For example, referring again to FIG. 12, a user can use the device interface 1200 to instruct the system to charge DEVICE #2 until it reaches 50% of capacity. Thus, in this example at 1347, the control circuit 1010 can cease providing a power signal to DEVICE #2 when the power level of DEVICE #2 reaches 50%. Optionally, an alert is provided to the user when the target device attains the specified power level. After the charge is completed, the example 1300 can end at 1350. If the charge is incomplete at 1347, then the example 1300 returns to 1310 to further evaluate the power source and optionally to continue providing the power signal to the target device.

VARIOUS NOTES & EXAMPLES

Example 1 can include or use subject matter (such as an apparatus, a method, a means for performing acts, or a device readable medium including instructions that, when performed by the device, can cause the device to perform acts), such as can include or use a portable carry case for receiving multiple portable electronic devices. The portable carry case can include a primary coil configured to inductively receive energy from a source coil of a removable wireless source device, a secondary coil configured to inductively provide energy to a target coil of a removable wireless target device, a communication circuit that electrically couples the primary coil and the secondary coil, and a control circuit configured to coordinate an energy transfer using the communication circuit and using one or both of the source device and the target device.

Example 2 can include, or can optionally be combined with the subject matter of Example 1, to optionally include a storage circuit coupled to the communication circuit, wherein the control circuit is configured to coordinate the energy transfer using one or both of the source device and the target device according to a selected operating mode. In Example 2, in a first operating mode, the control circuit coordinates an inductive power and/or data transfer from the removable wireless source device to the storage circuit using the communication circuit and the primary coil. In Example 2, in a second operating mode, the control circuit coordinates an inductive power and/or data transfer from the removable wireless source device to the removable wireless target device using the communication circuit, the primary coil, and the secondary coil. In Example 2, in a third operating mode, the control circuit coordinates an inductive power and/or data transfer from the storage circuit to the removable wireless target device using the communication circuit and the secondary coil.

Example 3 can include, or can optionally be combined with the subject matter of one or any combination of Examples 1 or 2 to optionally include the control circuit includes a data input, and the data input is configured to receive a user indication of a charge priority for multiple removable target devices that are communicatively coupled with the secondary coil. In Example 3, the control circuit is configured to coordinate an inductive energy transfer to at least one of the multiple removable target devices based on the user indication of the charge priority.

Example 4 can include, or can optionally be combined with the subject matter of Example 3, to optionally include the data input is configured to receive the user indication of the charge priority, and the charge priority includes a charge sequence or a charge apportionment for the multiple removable target devices.

Example 5 can include, or can optionally be combined with the subject matter of one or any combination of Examples 1 through 4 to optionally include multiple secondary coils in the portable carry case configured to inductively provide energy to multiple respective target coils, the multiple respective target coils corresponding to power and/or data communication ports in respective removable wireless target devices. In Example 5, the control circuit can be configured to coordinate an inductive power and/or data transfer to a selected one or more of the removable wireless target devices using the multiple secondary coils and the multiple respective target coils.

Example 6 can include, or can optionally be combined with the subject matter of one or any combination of Examples 1 through 5 to include, subject matter (such as an apparatus, a method, a means for performing acts, or a machine readable medium including instructions that, when performed by the machine, that can cause the machine to perform acts), such as can include a non-transitory machine-readable medium including instructions that, when executed on a charge management controller (CMC), cause the CMC to perform operations including receiving a charge mode instruction from at least one of a wireless source device, a wireless target device, or a carry case interface of a carry case that is configured to house the wireless source device and the wireless target device, wherein (1) when the charge mode instruction indicates a first charge mode, the CMC operations include coordinating an inductive power transfer from the source device to a power storage circuit, the power storage circuit included in a carry case. (2) when the charge mode instruction indicates a second charge mode, the CMC operations include coordinating an inductive power transfer from the source device to the target device, and (3) when the charge mode instruction indicates a third charge mode, the CMC operations include coordinating an inductive power transfer from the power storage circuit to the target device.

Example 7 can include, or can optionally be combined with the subject matter of Example 6, to optionally include instructions that, when executed on the CMC, cause the CMC to perform operations including identifying multiple target devices located in or near the carry case, presenting, to a user, an indication of the identified multiple target devices, and receiving, from the user, an indication of a charge priority among the identified multiple target devices.

Example 8 can include, or can optionally be combined with the subject matter of Example 7, to optionally include presenting, to the user, the indication of the identified multiple target devices, including presenting the indication using a graphical interface of the wireless source device, and wherein the receiving, from the user, the indication of the charge priority includes using the same graphical interface.

Example 9 can include, or can optionally be combined with the subject matter of one or any combination of Examples 6 through 8 to optionally include instructions that, when executed on the CMC, cause the CMC to perform operations including authenticating at least one of the source device and the target device, and when at least one of the source device and the target device is indicated to be authentic, then enabling the receiving the charge mode instruction for the authenticated target device.

Example 10 can include, or can optionally be combined with the subject matter of one or any combination of Examples 6 through 9 to optionally include instructions that, when executed on the CMC, cause the CMC to perform operations including identifying an energy transfer efficiency characteristic for each of the first, second, and third charge modes, and selecting for use one of the first, second, and third charge modes based on the identified energy transfer efficiency characteristic.

Example 11 can include, or can optionally be combined with the subject matter of Example 10, to optionally include identifying the energy transfer efficiency characteristic, including performing a test energy transfer according to each of the first, second, and third charge modes.

Example 12 can include, or can optionally be combined with the subject matter of Example 10, to optionally include identifying the energy transfer efficiency characteristic, including using information about a relative physical orientation of at least one of the source device and the target device with respect to primary and secondary coils, respectively, that are integrated with the carry case and are configured for use in an inductive power transfer from the wireless source device or to the wireless target device.

Example 13 can include, or can optionally be combined with the subject matter of one or any combination of Examples 1 through 12 to include, subject matter (such as an apparatus, a method, a means for performing acts, or a machine readable medium including instructions that, when performed by the machine, that can cause the machine to perform acts), such as can include a system for inductively transferring power or data between portable devices. In Example 13, the system can include a portable carry case with a first compartment configured to receive a removable source device, at least one primary coil positioned with respect to the first compartment and configured to inductively receive energy from a source coil of the source device, a second compartment configured to receive a removable target device, and at least one secondary coil positioned with respect to the second compartment and configured to inductively provide energy to a target coil of the target device. Example 13 can include a control circuit configured to coordinate an inductive energy transfer (1) from the removable source device using the primary coil, or (2) to the removable target device using the secondary coil, or a wired communication link configured to communicate an electrical signal between at least two of the primary coil, the secondary coil, and the control circuit. In an example, the inductive energy transfer includes at least one of a power signal and a data signal.

Example 14 can include, or can optionally be combined with the subject matter of Example 13, to optionally include a power storage circuit, and wherein the communication link is configured by the control circuit to selectively communicate power (1) from the primary coil to the power storage circuit, (2) from the power storage circuit to the secondary coil, or (3) from the primary coil to the secondary coil.

Example 15 can include, or can optionally be combined with the subject matter of Example 14, to optionally include the removable source device, wherein in response to instructions communicated from the removable source device to the control circuit, the control circuit configures the communication link to selectively communicate the power (1) from the primary coil to the power storage circuit, (2) from the power storage circuit to the secondary coil, or (3) from the primary coil to the secondary coil.

Example 16 can include, or can optionally be combined with the subject matter of Example 15, to optionally include the power storage circuit is configured to receive and store power from the source device over a first duration, and wherein the power storage circuit is configured to provide the power to the target device over a second duration.

Example 17 can include, or can optionally be combined with the subject matter of Example 16, to optionally include the first and second durations are non-overlapping.

Example 18 can include, or can optionally be combined with the subject matter of one or any combination of Examples 13 through 17 to optionally include the control circuit configured to determine an energy transfer efficiency characteristic about a direct wireless energy exchange between the source device and the target device in the portable carry case and, based on the determined energy transfer efficiency characteristic, the control circuit is configured to enable or disable the wired communication link.

Example 19 can include, or can optionally be combined with the subject matter of one or any combination of Examples 13 through 18 to optionally include the second compartment includes multiple secondary coils, wherein the second compartment is configured to receive multiple removable target devices, and wherein the control circuit is configured to apportion an available power signal to two or more of the multiple secondary coils, the two or more of the multiple secondary coils corresponding respectively to the multiple removable target devices.

Example 20 can include, or can optionally be combined with the subject matter of Example 19, to optionally include the control circuit configured to apportion the available power signal to the multiple removable target devices according to a control signal received from the removable source device.

Example 21 can include, or can optionally be combined with the subject matter of Example 19, to optionally include the control circuit configured to apportion the available power signal to the multiple removable target devices according to a control signal received from at least one of the multiple removable target devices.

Example 22 can include, or can optionally be combined with the subject matter of Example 19, to optionally include, with the portable carry case, an interface configured to receive a user input, and wherein the control circuit is configured to apportion the available power signal to the multiple removable target devices according to the user input.

Example 23 can include, or can optionally be combined with the subject matter of Example 19, to optionally include, with the portable carry case, an interface that is configured to provide information to a user about (1) an available power characteristic of the portable carry case or an available power characteristic of the source device, and (2) a power charge status of at least one of the multiple removable target devices.

Example 24 can include, or can optionally be combined with the subject matter of one or any combination of Examples 13 through 23 to optionally include the first compartment having multiple primary coils, and the control circuit is configured to identify one or more of the multiple primary coils to use for inductively receiving the energy from the source device according to an energy transfer characteristic measured between each of the multiple primary coils and the source device. In Example 24, the energy transfer characteristic can be measured by one or more of the source device, the target device, and the control circuit.

Example 25 can include, or can optionally be combined with the subject matter of one or any combination of Examples 13 through 24 to optionally include the second compartment configured to receive multiple removable target devices, and the control circuit can be configured to identify contents of the second compartment and report the identified contents using the removable source device or using an ancillary device that is in data communication with the control circuit.

Example 26 can include, or can optionally be combined with the subject matter of Example 25, to optionally include, in response to instructions communicated from the removable source device to the control circuit, configuring the control circuit to selectively communicate power to the multiple removable target devices according to a user-specified charge priority.

Example 27 can include, or can optionally be combined with the subject matter of one or any combination of Examples 13 through 26 to optionally include the control circuit configured to interrupt energy communication from the source device to the target device when a remaining power level of the source device is less than a specified threshold power level.

Example 28 can include, or can optionally be combined with the subject matter of one or any combination of Examples 13 through 27 to optionally include the control circuit configured to determine an authenticity characteristic of one or both of the source device and the target device, and wherein the control circuit is configured to selectively enable or disable the communication link according to the authenticity characteristic.

Example 29 can include, or can optionally be combined with the subject matter of one or any combination of Examples 13 through 28 to optionally include the control circuit configured to monitor an energy transfer efficiency characteristic about energy communication between the at least two of the primary coil, the secondary coil, and the control circuit, and wherein the control circuit is configured to selectively enable or disable the wired communication link when the energy transfer efficiency characteristic indicates less than a specified threshold efficiency.

Example 30 can include, or can optionally be combined with the subject matter of one or any combination of Examples 13 through 29 to optionally include the first and second compartments are physically separated in the portable carry case, such as using a physical partition in the case.

Example 31 can include, or can optionally be combined with the subject matter of one or any combination of Examples 13 through 30 to optionally include, with the portable carry case, a data storage circuit, and wherein the wired communication link is configured to communicate digital data from the primary coil to the data storage circuit, and wherein the wired communication link is configured to communicate digital data from the data storage circuit to the secondary coil.

Example 32 can include, or can optionally be combined with the subject matter of one or any combination of Examples 1 through 31 to include, subject matter (such as an apparatus, a method, a means for performing acts, or a machine readable medium including instructions that, when performed by the machine, that can cause the machine to perform acts), such as can include a system for inductively transferring power or data between portable devices. In Example 32, the system can include a portable carry case having a compartment configured to receive multiple removable electronic devices, each of the multiple removable electronic devices including at least one respective communication coil configured to inductively wirelessly communicate with another coil. Example 32 can include a control circuit configured to identify at least one source device and at least one target device among the multiple removable electronic devices, and coordinate wireless power and/or data communication from the at least one source device to the at least one target device when the source and target devices are together in the portable compartment.

Example 33 can include, or can optionally be combined with the subject matter of Example 32, to optionally include multiple coils that are positioned with respect to the compartment and are in power and/or data communication with the control circuit, wherein each of the multiple coils is configured to provide or receive an inductive field for power and data communication with at least one communication coil corresponding to one of the multiple removable electronic devices.

Each of the above non-limiting examples can stand on its own, or can be combined in various permutations or combinations with one or more of the other examples.

In the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first", "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system for inductively transferring power or data between portable devices, the system comprising:
a portable carry case including:
a first compartment configured to receive a removable source device;
at least one primary coil positioned inside of or coupled to the first compartment and configured to inductively receive energy from a source coil of the removable source device when the removable source device is provided in the first compartment;
a second compartment configured to receive multiple removable target devices;
multiple secondary coils positioned inside of or coupled to the second compartment and configured to inductively provide energy to respective target coils of the multiple removable target devices; and
a control circuit configured to coordinate an inductive energy transfer from the removable source device to the multiple removable target devices according to a user-specified charge priority.

2. The system of claim 1, wherein the control circuit is configured to apportion an available power signal to two or more of the multiple secondary coils, the two or more of the multiple secondary coils corresponding respectively to the multiple removable target devices.

3. The system of claim 2, wherein the control circuit is configured to apportion the available power signal to the multiple removable target devices according to a control signal received from the removable source device.

4. The system of claim 2, wherein the control circuit is configured to apportion the available power signal to the multiple removable target devices according to a control signal received from at least one of the multiple removable target devices.

5. The system of claim 2, wherein the portable carry case includes an interface configured to receive a user input, and wherein the control circuit is configured to apportion the available power signal to the multiple removable target devices according to the user input.

6. The system of claim 2, wherein the portable carry case includes an interface, and wherein the interface is configured to provide information to a user about (1) an available power characteristic of the portable carry case or an available power characteristic of the removable source device, and (2) a power charge status of at least one of the multiple removable target devices.

7. The system of claim 1, wherein the first compartment comprises multiple primary coils, and wherein the control circuit is configured to identify one or more of the multiple primary coils to use for inductively receiving the energy from the removable source device according to an energy transfer characteristic measured between each of the multiple primary coils and the removable source device, wherein the energy transfer characteristic is measured by one or more of the removable source device, one or more of the multiple removable target devices, and the control circuit.

8. The system of claim 1, wherein the control circuit is configured to identify contents of the second compartment and report the identified contents using the removable source device or using an ancillary device that is in data communication with the control circuit.

9. The system of claim 1, wherein the control circuit is configured to interrupt energy communication from the removable source device to the target coil when a remaining power level of the removable source device is less than a specified threshold power level.

10. The system of claim 1, wherein the control circuit is configured to determine an authenticity characteristic of one or more of the removable source device and the multiple removable target devices, and wherein the control circuit is configured to selectively enable or disable the inductive energy transfer according to the authenticity characteristic.

11. The system of claim 1, wherein the control circuit is configured to monitor an energy transfer efficiency characteristic about energy communication between at least two of the primary coil, the secondary coils, and the control circuit, and wherein the control circuit is configured to selectively enable or disable the inductive energy transfer when the energy transfer efficiency characteristic indicates less than a specified threshold efficiency.

12. The system of claim 1, wherein the user-specified charge priority includes instructions communicated from the removable source device to the control circuit.

13. The system of claim 1, further comprising a wired communication link coupling the control circuit to the primary coil and the secondary coils.

14. The system of claim 13, wherein the portable carry case includes a power storage circuit, and wherein the communication link is configured by the control circuit to selectively communicate power (1) from the primary coil to the power storage circuit, (2) from the power storage circuit to the secondary coils, or (3) from the primary coil to the secondary coils.

15. The system of claim 14, further comprising the removable source device, wherein in response to instructions communicated from the removable source device to the control circuit, the control circuit configures the communication link to selectively communicate the power (1) from the primary coil to the power storage circuit, (2) from the power storage circuit to the secondary coils, or (3) from the primary coil to the secondary coils.

16. The system of claim 14, wherein the power storage circuit is configured to receive and store power from the removable source device over a first duration, and wherein the power storage circuit is configured to provide the power to one or more of the multiple removable target devices over a second duration.

17. The system of claim 16, wherein the first and second durations are non-overlapping.

18. The system of claim 13, wherein the control circuit is configured to determine an energy transfer efficiency characteristic about a direct wireless energy exchange between the removable source device and a first one of the multiple removable target devices in the portable carry case and, based on the determined energy transfer efficiency characteristic, the control circuit is configured to enable or disable the wired communication link.

19. The system of claim 1, wherein the inductive energy transfer includes a data signal.

20. A portable carry case for receiving multiple portable electronic devices, the portable carry case comprising:
a first compartment including a primary coil inside of or coupled to the first compartment, the primary coil configured to inductively receive energy from a source coil of a removable wireless source device when the removable wireless source device is disposed inside the portable carry case;
a second compartment including multiple secondary coils inside of or coupled to the second compartment, the multiple secondary coils configured to inductively provide energy to respective target coils of removable wireless target devices;
a communication circuit that electrically couples the primary coil and the secondary coils; and
a control circuit configured to coordinate an energy transfer using the communication circuit wherein the control circuit includes a data input configured to receive a user indication of a charge priority for the removable target devices that are communicatively coupled with respective ones of the secondary coils, and the control circuit is configured to coordinate the energy transfer to at least one of the multiple removable target devices based on the user indication of the charge priority.

21. The portable carry case of claim 20, further comprising a storage circuit coupled to the communication circuit, wherein the control circuit is configured to coordinate the energy transfer using one or both of the removable wireless source device and the at least one of the multiple removable target devices according to a selected operating mode, wherein:
in a first operating mode, the control circuit coordinates an inductive power and/or data transfer from the removable wireless source device to the storage circuit using the communication circuit and the primary coil;
in a second operating mode, the control circuit coordinates an inductive power and/or data transfer from the removable wireless source device to the at least one of the multiple removable target devices using the communication circuit, the primary coil, and at least one of the secondary coils; and
in a third operating mode, the control circuit coordinates an inductive power and/or data transfer from the storage circuit to the at least one of the multiple removable target devices using the communication circuit and at least one of the secondary coils.

22. The portable carry case of claim 20, wherein the data input is configured to receive the user indication of the charge priority, and wherein the charge priority includes a charge sequence for the multiple removable target devices.

23. The portable carry case of claim 20, wherein the data input is configured to receive the user indication of the charge priority, and wherein the charge priority includes a charge apportionment for the multiple removable target devices.

24. The portable carry case of claim 20, wherein the control circuit is configured to identify device contents of the case that are available to receive energy from the secondary coils and report the identified contents using the removable wireless source device or using an ancillary device that is in data communication with the control circuit.

25. The portable carry case of claim 20, wherein the control circuit is configured to determine an energy transfer efficiency characteristic about a wireless energy exchange between the removable wireless source device and the at least one of the multiple removable target devices in the portable carry case and, based on the determined energy transfer efficiency characteristic, the control circuit is configured to enable or disable the communication circuit.

26. A system for inductively transferring power or data between portable devices, the system comprising:
a portable carry case having multiple compartments configured to receive multiple removable electronic devices, each of the multiple removable electronic devices including at least one respective communication coil configured to inductively wirelessly communicate with a respective compartment coil of the portable carry case, and the compartment coils are provided inside of or coupled to respective compartments of the portable carry case; and a control circuit configured to:
  identify at least one source device in a first one of the compartments and at least two target devices, in at least one other of the compartments, among the multiple removable electronic devices; and
  coordinate, based on a user-specified charge priority, wireless power communication from the at least one source device via a first compartment coil of the portable carry case to the target devices via respective other compartment coils of the portable carry case when the source and target devices are in the portable carry case.

27. The system of claim 26, wherein the control circuit is configured to identify device contents of the case that are available to communicate power and report the identified contents using the source device and/or using an ancillary device that is in data communication with the control circuit.

28. The system of claim 26, wherein the control circuit is configured to determine an energy transfer efficiency characteristic about a wireless power communication between the source device and the target devices and, based on the determined energy transfer efficiency characteristic, the control circuit is configured to enable or disable the power communication.

* * * * *